US012620608B2

(12) United States Patent
Kim et al.

(10) Patent No.: US 12,620,608 B2
(45) Date of Patent: May 5, 2026

(54) FUEL CELL HUMIDIFIER

(71) Applicant: KOLON INDUSTRIES, INC., Seoul (KR)

(72) Inventors: Do Woo Kim, Seoul (KR); Hyoung Mo Yang, Seoul (KR); In Ho Kim, Seoul (KR); Na Hyun Ahn, Seoul (KR)

(73) Assignee: KOLON INDUSTRIES, INC., Seoul (KR)

( * ) Notice: Subject to any disclaimer, the term of this patent is extended or adjusted under 35 U.S.C. 154(b) by 588 days.

(21) Appl. No.: 17/766,535

(22) PCT Filed: Nov. 27, 2020

(86) PCT No.: PCT/KR2020/017078
§ 371 (c)(1),
(2) Date: Apr. 5, 2022

(87) PCT Pub. No.: WO2021/107683
PCT Pub. Date: Jun. 3, 2021

(65) Prior Publication Data
US 2023/0290971 A1      Sep. 14, 2023

(30) Foreign Application Priority Data

Nov. 29, 2019    (KR) ........................ 10-2019-0156903
Nov. 29, 2019    (KR) ........................ 10-2019-0157111
Nov. 29, 2019    (KR) ........................ 10-2019-0157214

(51) Int. Cl.
*H01M 8/04119*        (2016.01)
*H01M 8/10*           (2016.01)

(52) U.S. Cl.
CPC ... *H01M 8/04149* (2013.01); *H01M 8/04141* (2013.01); *H01M 2008/1095* (2013.01)

(58) Field of Classification Search
CPC ......... H01M 8/04149; H01M 8/04141; H01M 2008/1095
(Continued)

(56) References Cited

U.S. PATENT DOCUMENTS 4,334,993 A * 6/1982 Norton ............... B01D 63/0221
                                                     165/83
7,094,348 B2 * 8/2006 Sunohara ............. B01D 63/034
                                                    210/321.71
(Continued)

FOREIGN PATENT DOCUMENTS

CN        101506591 A    8/2009
CN        102648547 A    8/2012
(Continued)

OTHER PUBLICATIONS

The office action dated May 26, 2023 related to the corresponding Japanese Patent application.
(Continued)

*Primary Examiner* — Charles S Bushey
(74) *Attorney, Agent, or Firm* — Harvest IP Law, LLP

(57)        ABSTRACT

The present invention relates to a fuel cell humidifier including: a humidifying module for humidifying dry gas, supplied from outside, by using wet gas discharged from a fuel cell stack; and a first cap coupled to one end of the humidifying module, wherein the humidifying module includes a mid-case, and at least one cartridge which is disposed in the mid-case and accommodates a plurality of hollow fiber membranes. The fuel cell humidifier further includes a first packing member airtightly coupled to at least one end of the humidifying module through mechanical assembly so that the first cap may fluidly communicate with only the hollow fiber membranes, wherein the first packing (Continued)

member tightly adheres to the cartridge by using the pressure of at least one among the dry gas and wet gas.

18 Claims, 19 Drawing Sheets

(58) Field of Classification Search
USPC ......................................................... 261/104
See application file for complete search history.

(56) References Cited

U.S. PATENT DOCUMENTS

| | | | | | |
|---|---|---|---|---|---|
| 9,160,015 | B2 * | 10/2015 | Kim | .................. | H01M 8/04149 |
| 9,190,677 | B2 * | 11/2015 | Kim | .................. | H01M 8/04149 |
| 9,833,745 | B2 * | 12/2017 | Goebbert | .............. | B01D 63/06 |
| 11,870,109 | B2 * | 1/2024 | Kim | ................... | H01M 8/04119 |
| 12,191,539 | B2 * | 1/2025 | Ahn | ..................... | B01D 63/031 |
| 12,476,265 | B2 * | 11/2025 | Oh | ..................... | H01M 8/04141 |
| 2001/0015501 | A1 * | 8/2001 | Katagiri | ............ | H01M 8/04126 |
| | | | | | 261/154 |
| 2006/0147774 | A1 * | 7/2006 | Suzuki | .............. | H01M 8/04164 |
| | | | | | 429/513 |
| 2008/0067700 | A1 * | 3/2008 | Korytnikov | ....... | H01M 8/04149 |
| | | | | | 261/119.2 |
| 2008/0237902 | A1 * | 10/2008 | Nagumo | ................ | B01D 53/22 |
| | | | | | 261/104 |
| 2009/0325034 | A1 | 12/2009 | Kobayashi | | |
| 2010/0193975 | A1 | 8/2010 | Kammann | | |
| 2014/0291874 | A1 | 10/2014 | Kim | | |

FOREIGN PATENT DOCUMENTS

| | | | |
|---|---|---|---|
| CN | 106532084 | A | 3/2017 |
| CN | 106532085 | A | 3/2017 |
| CN | 109935854 | A | 6/2019 |
| DE | 102015001866 | A1 | 6/2016 |
| EP | 3958361 | A1 | 2/2022 |
| JP | H11151431 | A | 6/1999 |
| JP | 2008269867 | A | 11/2008 |
| JP | 2009-224211 | A | 10/2009 |
| JP | 2014522556 | A | 9/2014 |
| JP | 2016035895 | A | 3/2016 |
| JP | 2021508917 | A | 3/2021 |
| KR | 20140117346 | A | 10/2014 |
| KR | 20180001849 | A | 1/2018 |
| KR | 20180066418 | A | 6/2018 |
| KR | 20190055635 | A | 5/2019 |
| KR | 20190081736 | A | 7/2019 |
| WO | 2020213990 | A1 | 10/2020 |

OTHER PUBLICATIONS

The office action dated Nov. 22, 2023 related to the corresponding Chinese Patent application.
The search report dated Oct. 13, 2023 related to the corresponding European Patent application.
The office action dated Feb. 22, 2024 related to the corresponding Korean Patent.

* cited by examiner

【FIG. 2】
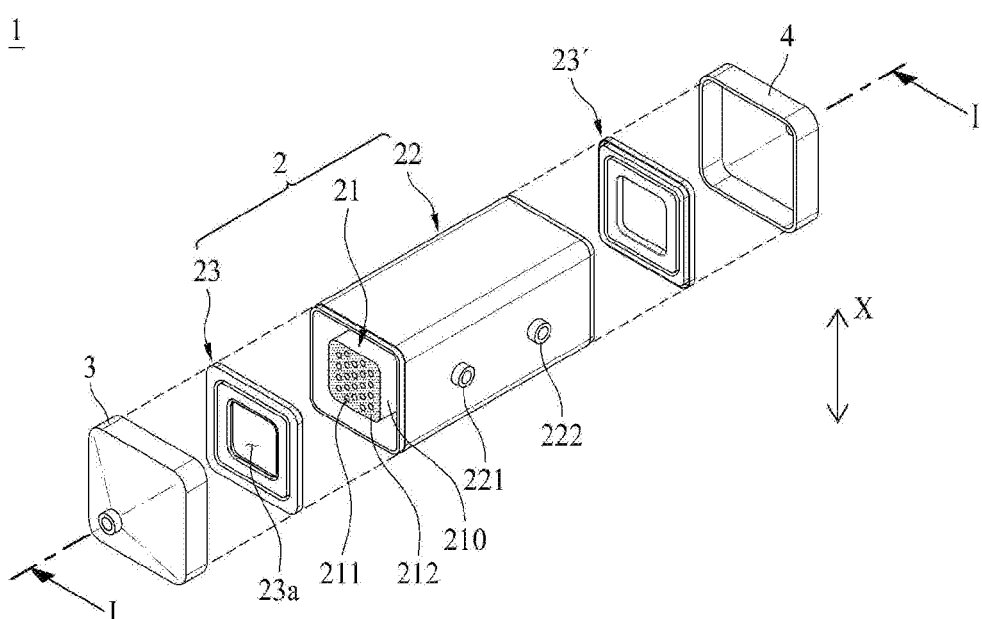
【FIG. 3】
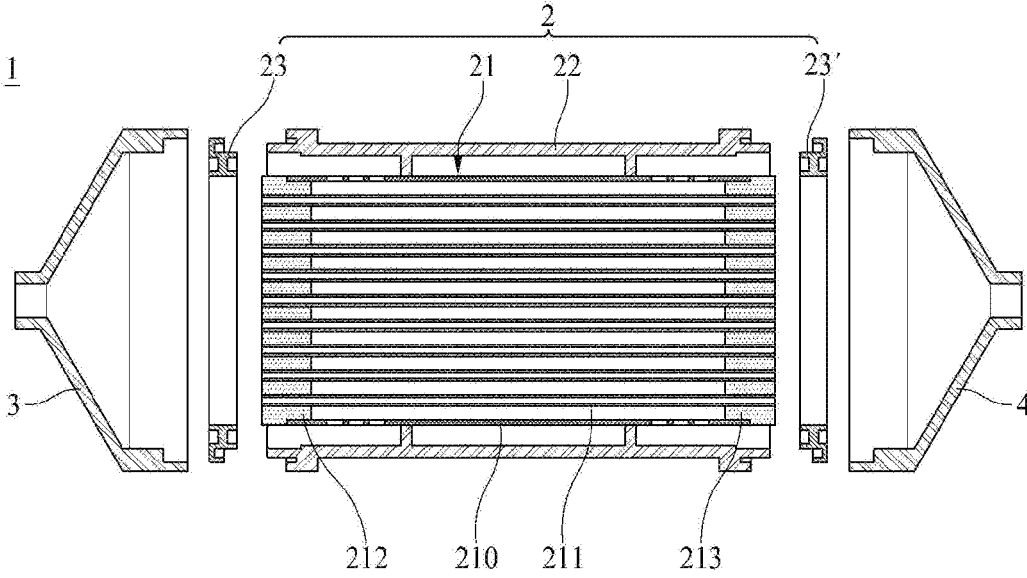

【FIG. 4】
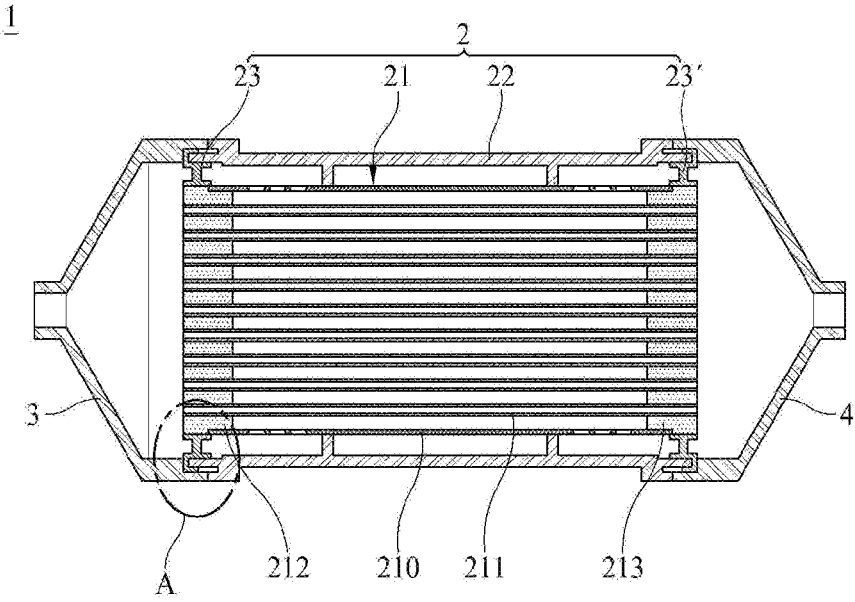
【FIG. 5】
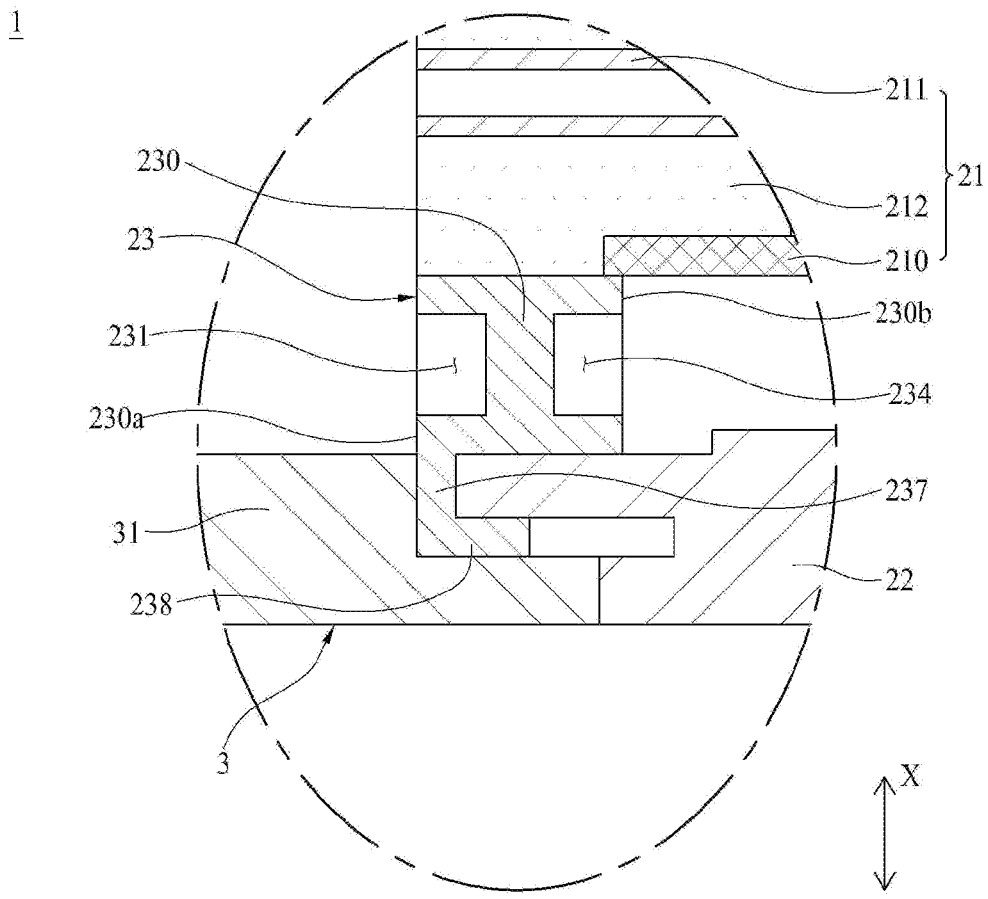

【FIG. 6】
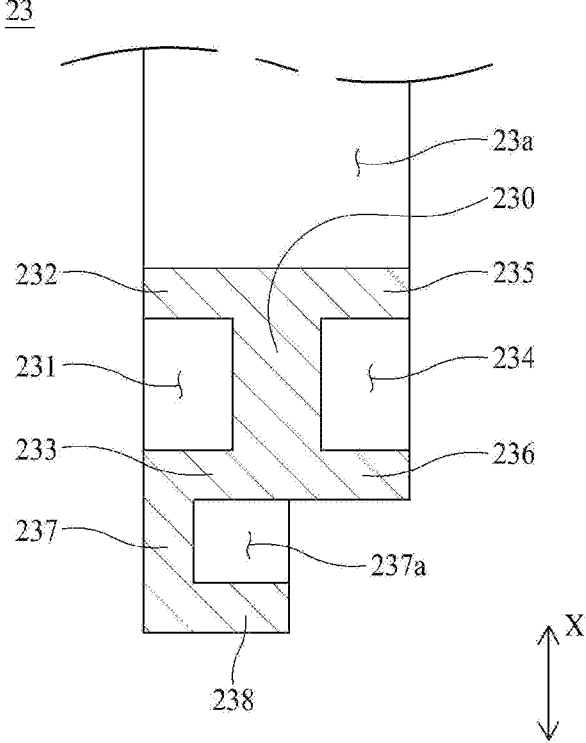
【FIG. 7】
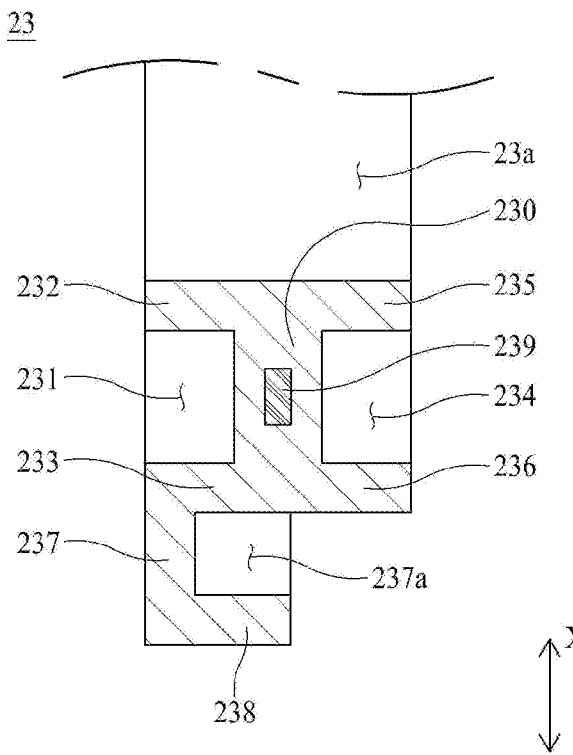

【FIG. 8】
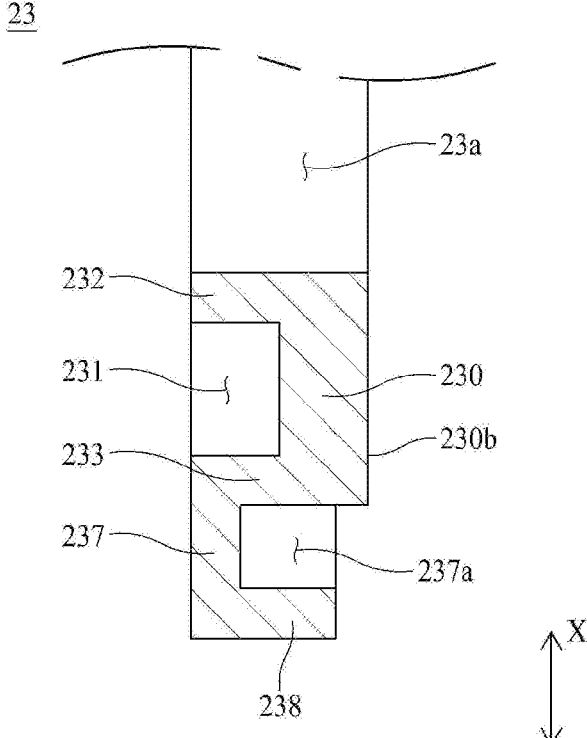
【FIG. 9】
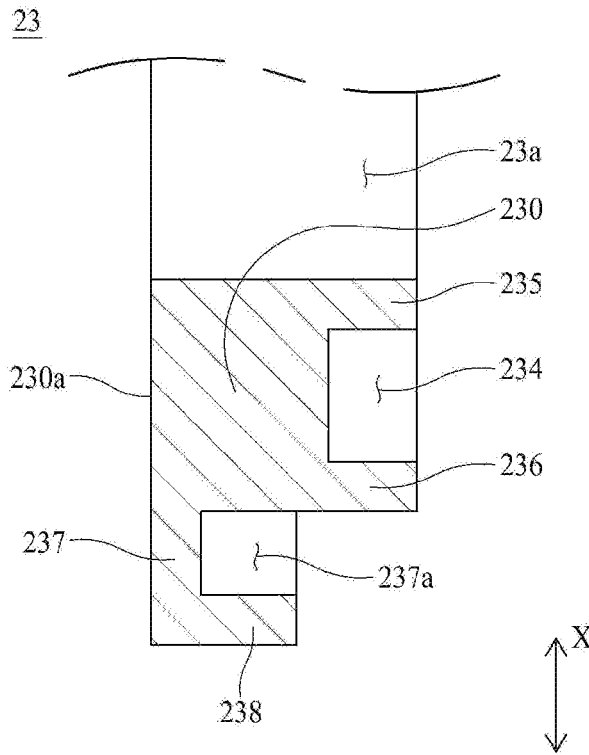

【FIG. 10】
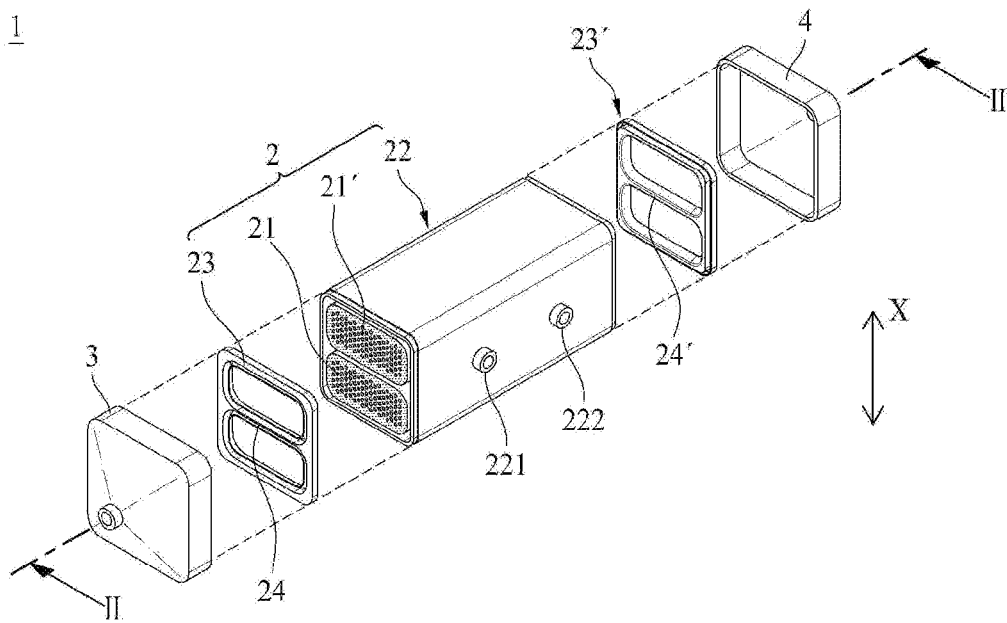

【FIG. 11】
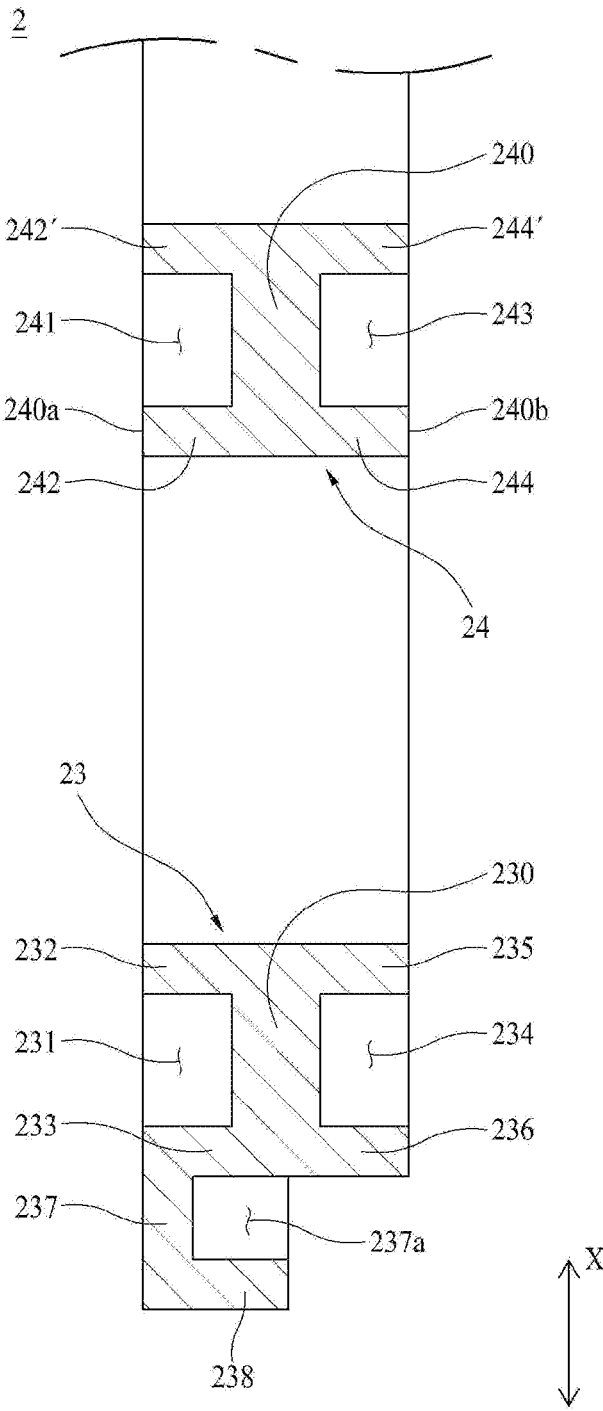

【FIG. 12】
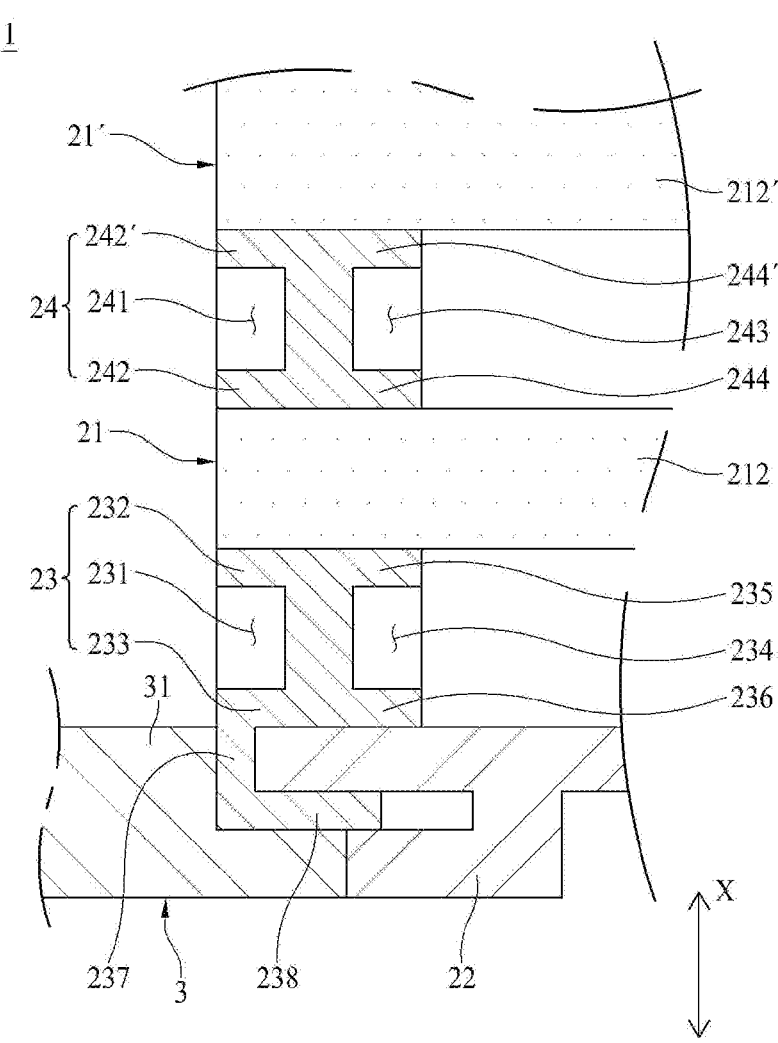

【FIG. 13】
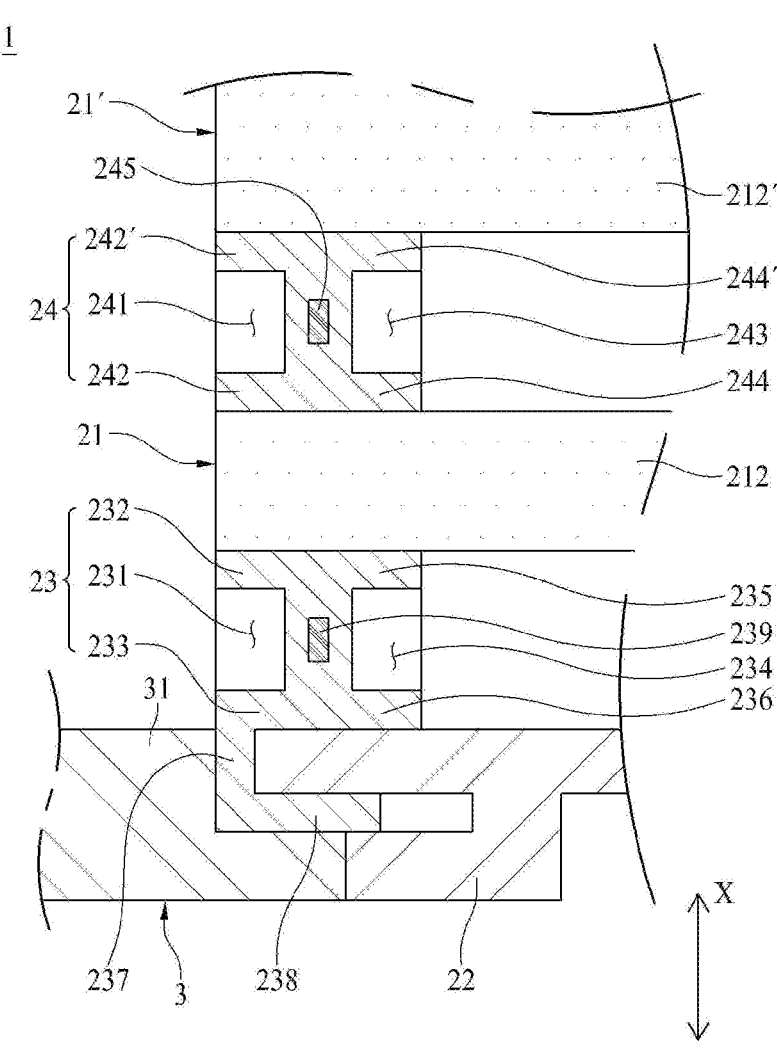

【FIG. 14】
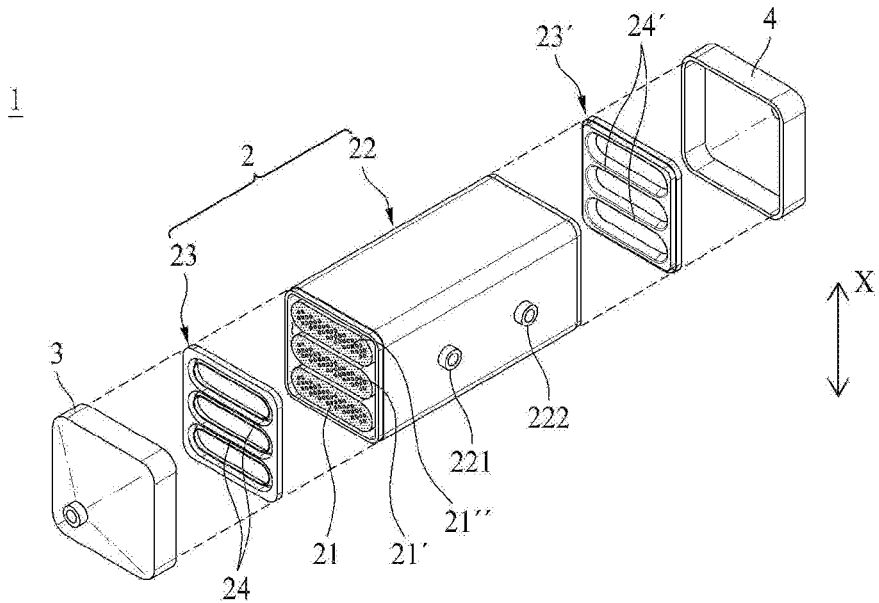

【FIG. 15】
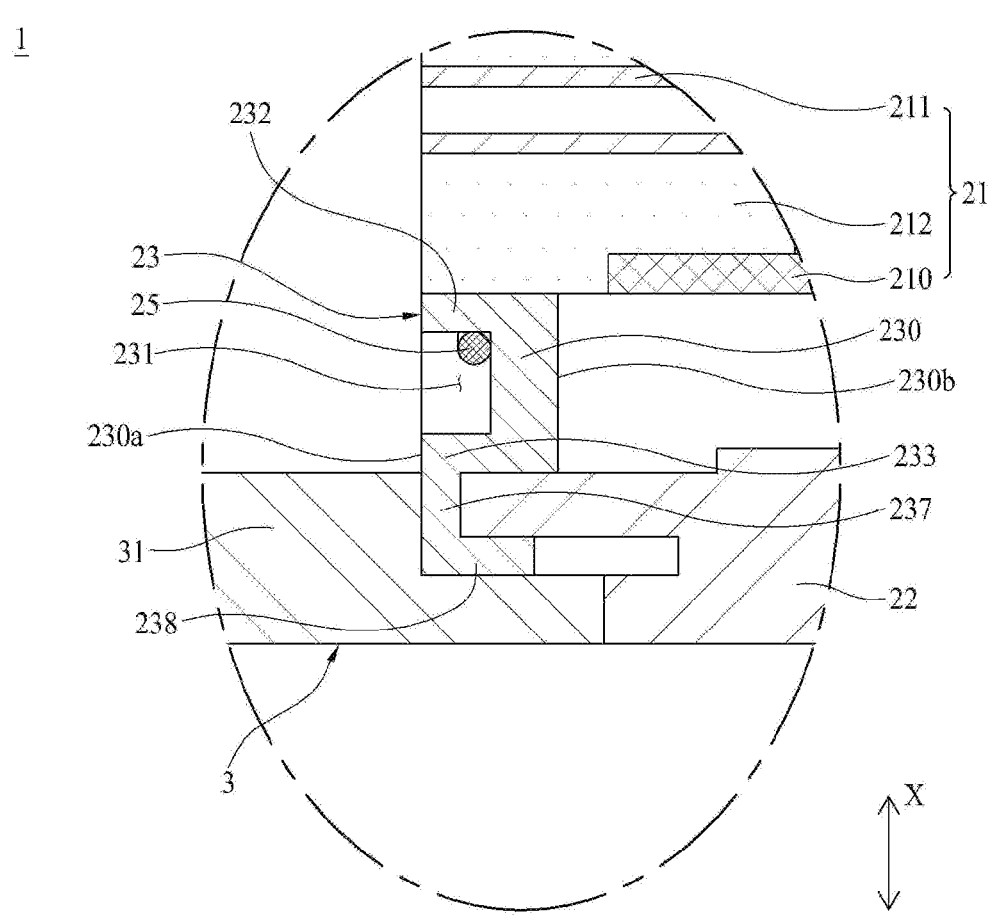

【FIG. 16】
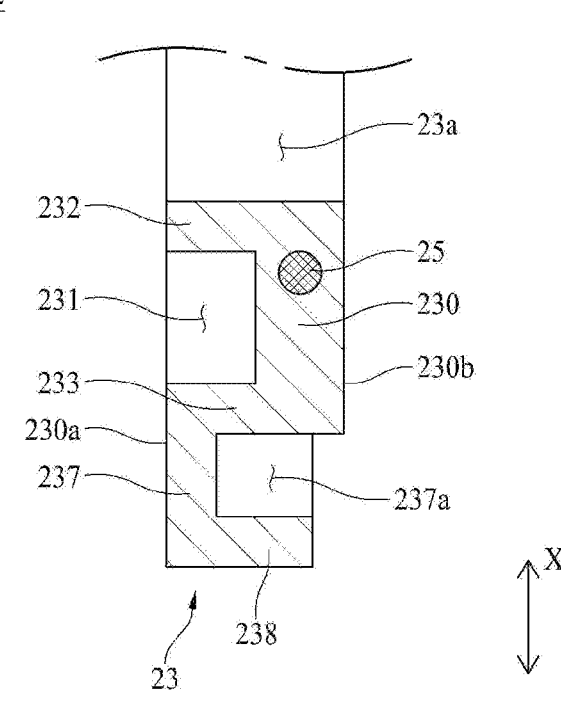
【FIG. 17】
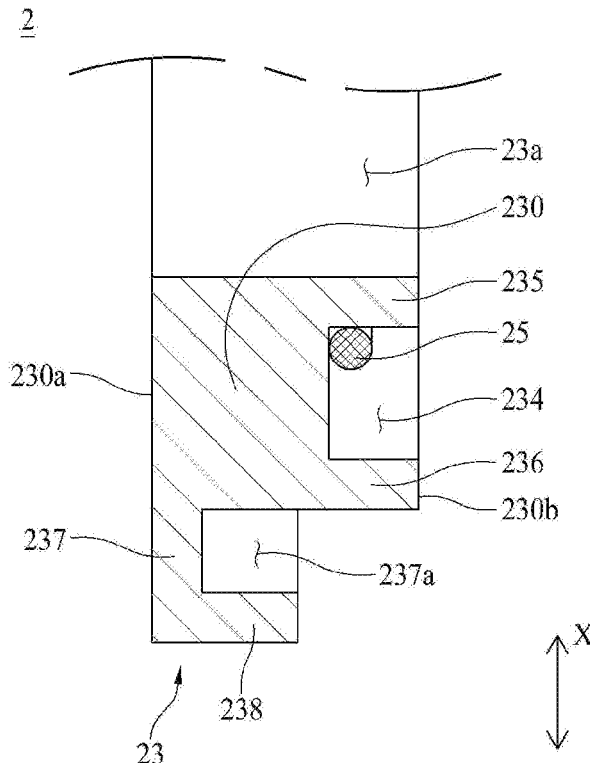

【FIG. 18】
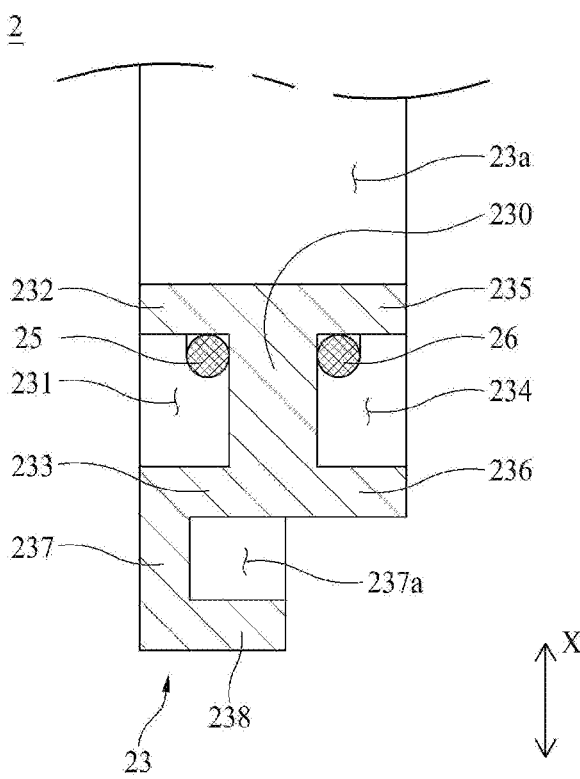

【FIG. 19】
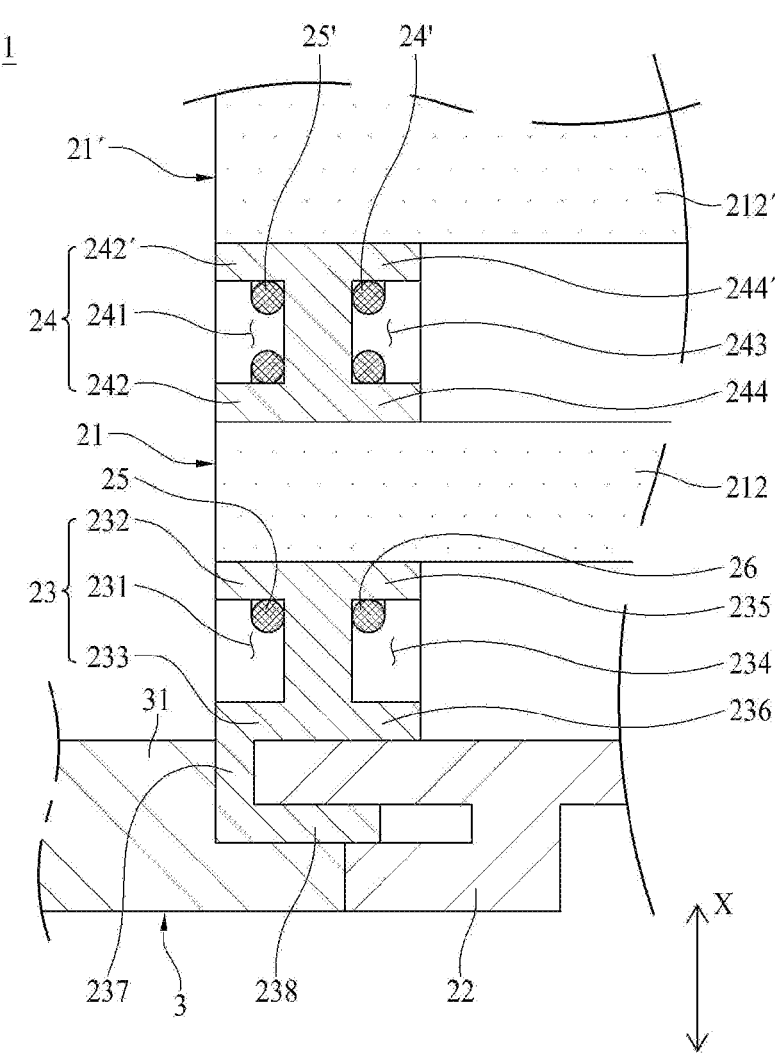

【FIG. 20】
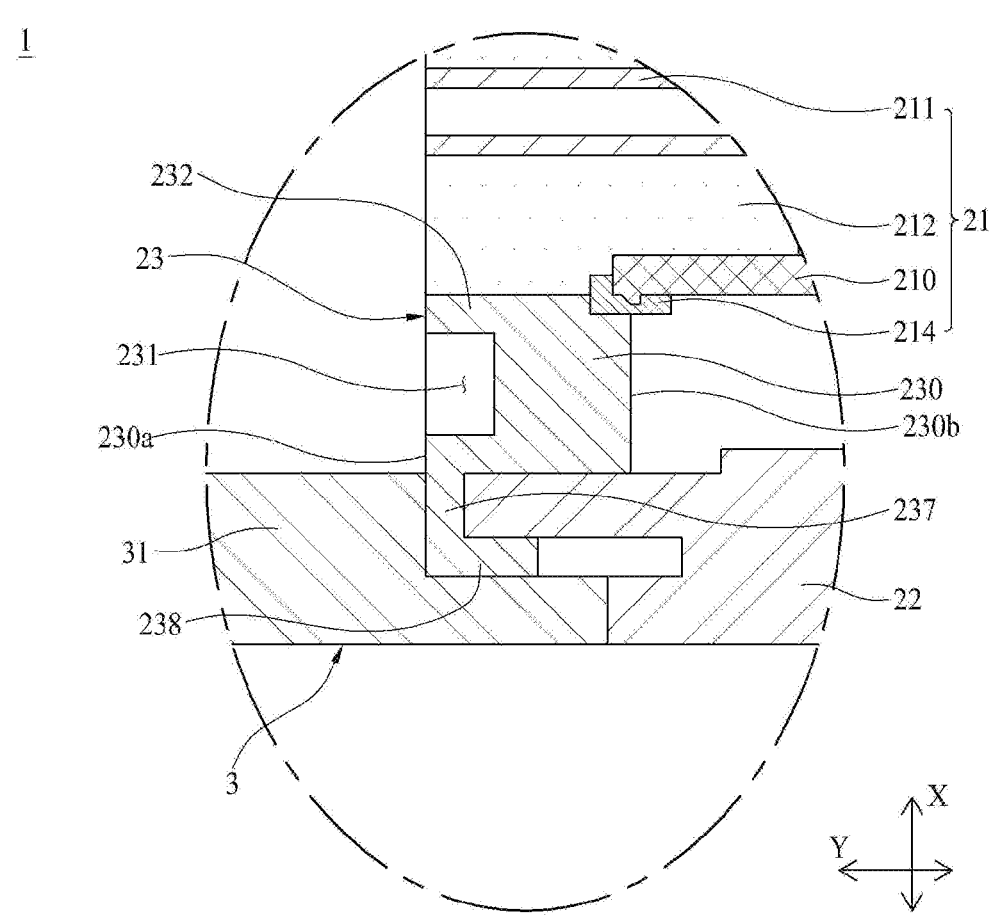

【FIG. 21】
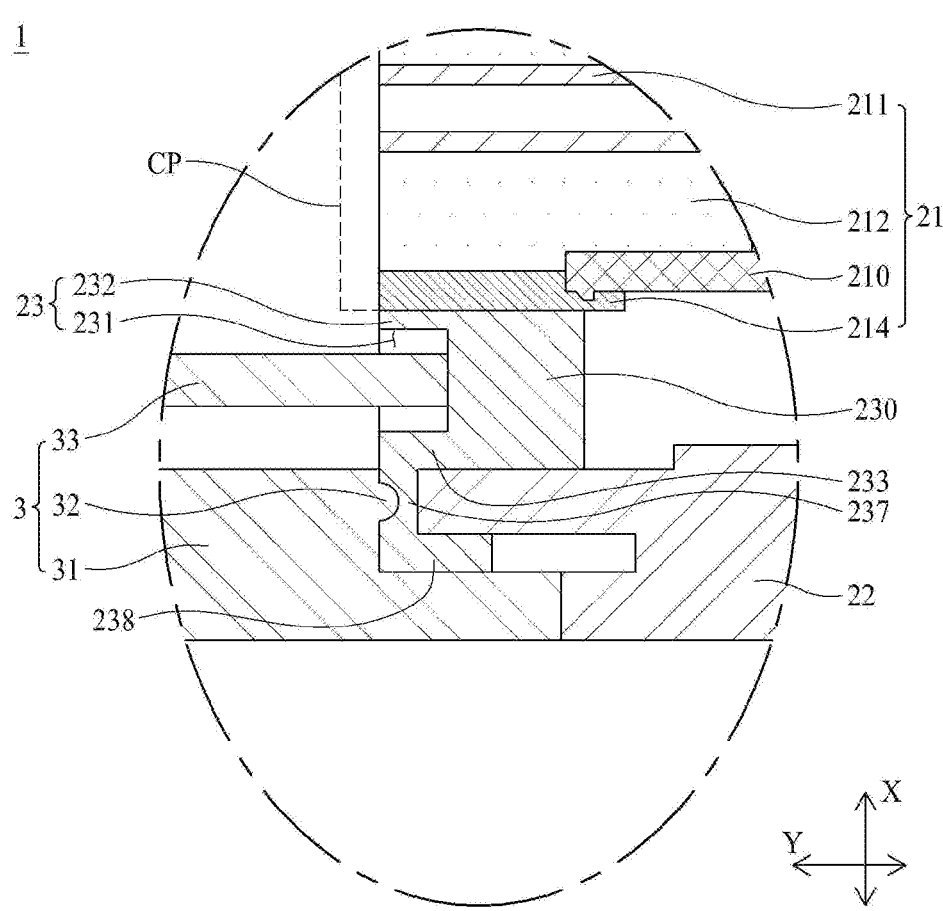

【FIG. 22】
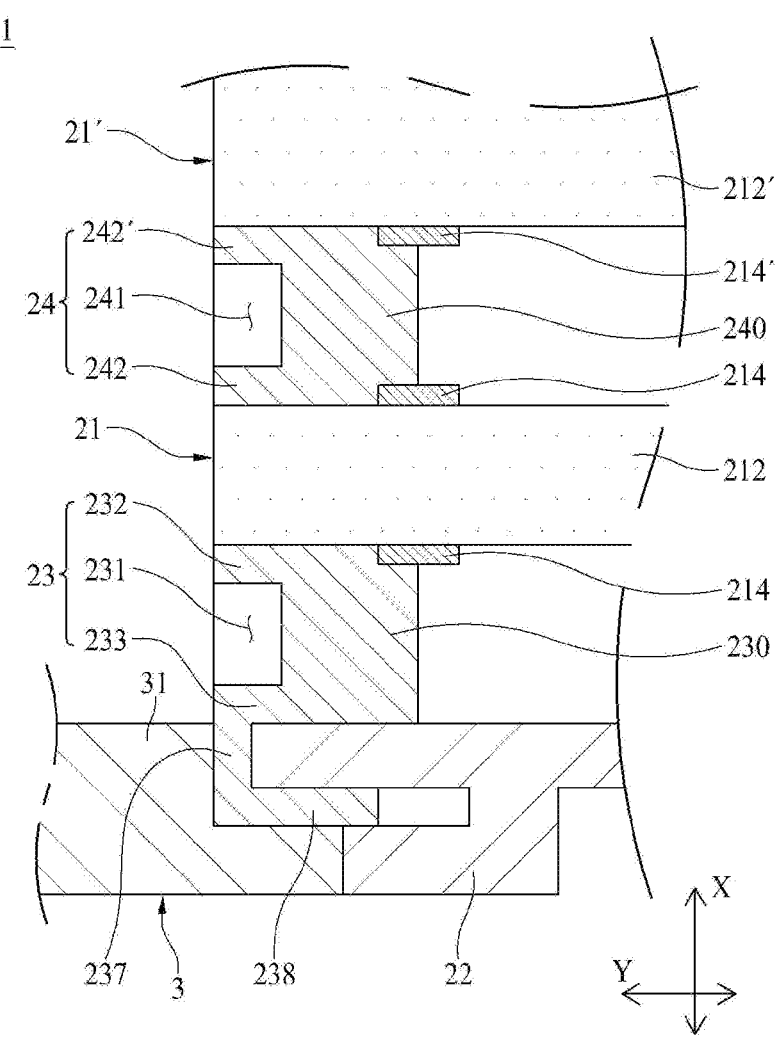

【FIG. 23】
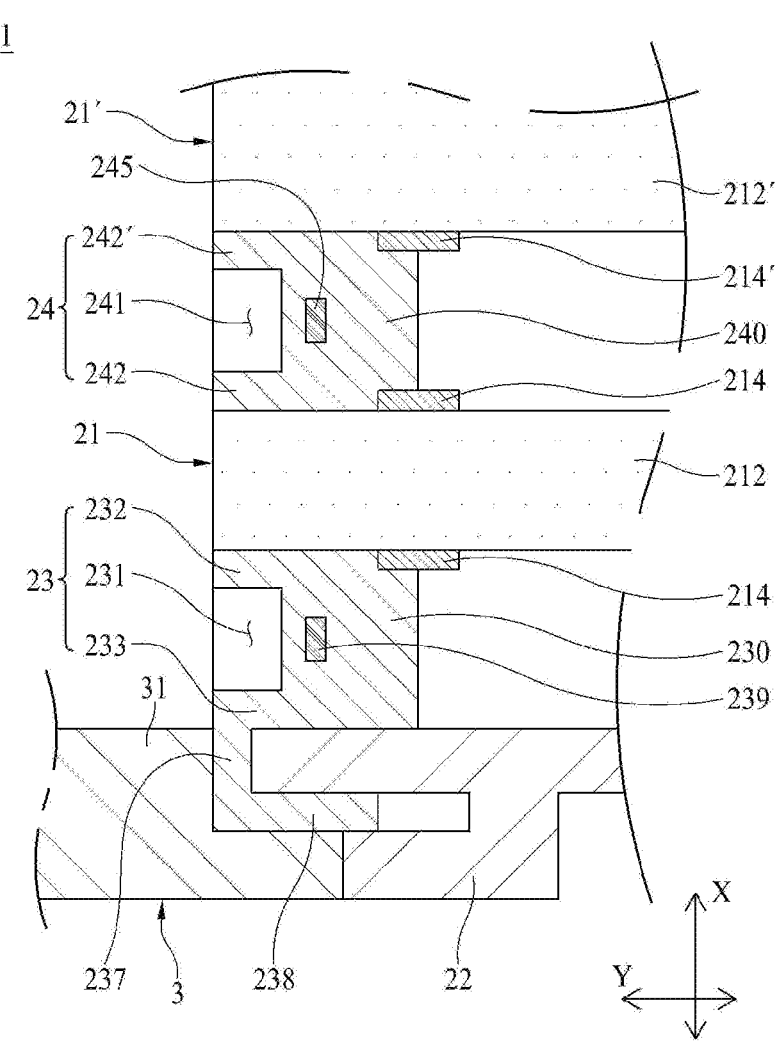

【FIG. 24】
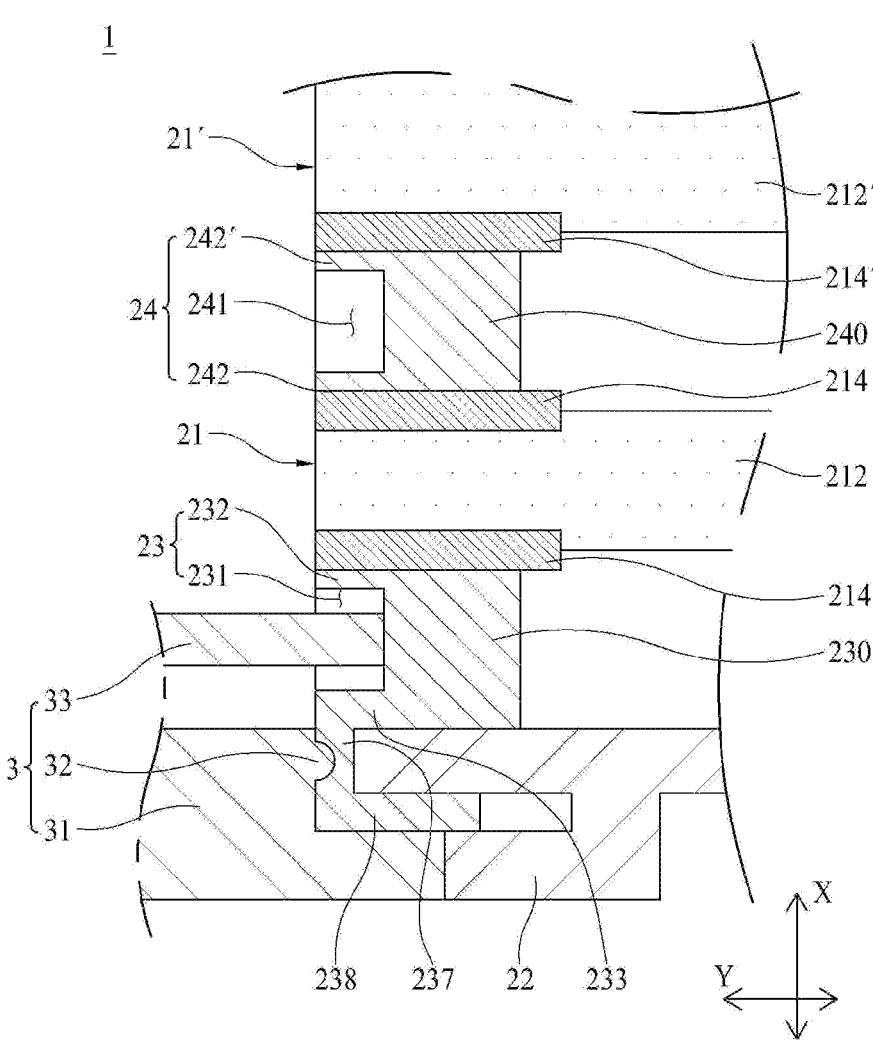

FUEL CELL HUMIDIFIER

CROSS REFERENCE TO RELATED APPLICATIONS

This application is a National Stage of International Application No. PCT/KR2020/017078 filed Nov. 27, 2020, claiming priority based on Korean Patent Application No. 10-2019-0156903 filed Nov. 29, 2019, Korean Patent Application No. 10-2019-0157111 filed Nov. 29, 2019 and Korean Patent Application No. 10-2019-0157214 filed Nov. 29, 2019, the disclosures of which are incorporated herein by reference in their entireties.

TECHNICAL FIELD

The present disclosure relates to a humidifier for fuel cells configured to supply humidified gas to a fuel cell.

BACKGROUND ART

A fuel cell has advantages in that it is possible to continuously generate electricity as long as hydrogen and oxygen are supplied, unlike a general chemical cell, such as a dry cell or a storage cell, and in that there is no heat loss, whereby efficiency of the fuel cell is about twice as high as efficiency of an internal combustion engine.

In addition, the fuel cell directly converts chemical energy generated by combination of hydrogen and oxygen into electrical energy, whereby the amount of contaminants that are discharged is small. Consequently, the fuel cell has advantages in that the fuel cell is environmentally friendly and in that a concern about depletion of resources due to an increase in energy consumption can be reduced.

Based on the kind of an electrolyte that is used, such a fuel cell may be classified as a polymer electrolyte membrane fuel cell (PEMFC), a phosphoric acid fuel cell (PAFC), a molten carbonate fuel cell (MCFC), a solid oxide fuel cell (SOFC), or an alkaline fuel cell (AFC).

These fuel cells are operated fundamentally by the same principle, but are different from each other in terms of the kind of fuel that is used, operating temperature, catalyst, and electrolyte. Among these fuel cells, the polymer electrolyte membrane fuel cell (PEMFC) is known as being the most favorable to a transportation system as well as small-scale stationary power generation equipment, since the polymer electrolyte membrane fuel cell is operated at a lower temperature than the other fuel cells and the output density of the polymer electrolyte membrane fuel cell is high, whereby it is possible to miniaturize the polymer electrolyte membrane fuel cell.

One of the most important factors in improving the performance of the polymer electrolyte membrane fuel cell (PEMFC) is to supply a predetermined amount or more of moisture to a polymer electrolyte membrane or a proton exchange membrane (PEM) of a membrane electrode assembly (MEA) in order to retain moisture content. The reason for this is that, if the polymer electrolyte membrane or the proton exchange membrane is dried, power generation efficiency is abruptly reduced.

1) A bubbler humidification method of filling a pressure-resistant container with water and allowing a target gas to pass through a diffuser in order to supply moisture, 2) a direct injection method of calculating the amount of moisture to be supplied that is necessary for fuel cell reaction and directly supplying moisture to a gas stream pipe through a solenoid valve, and 3) a membrane humidification method of supplying moisture to a gas fluid bed using a polymer separation membrane are used as methods of humidifying the polymer electrolyte membrane or the proton exchange membrane.

Among these methods, the membrane humidification method, which provides water vapor to air that is supplied to the polymer electrolyte membrane or the proton exchange membrane using a membrane configured to selectively transmit only water vapor included in off-gas in order to humidify the polymer electrolyte membrane or the proton exchange membrane, is advantageous in that it is possible to reduce the weight and size of a humidifier.

When a module is formed, a hollow fiber membrane having large transmission area per unit volume is suitable for a permselective membrane used in the membrane humidification method. That is, when a humidifier is manufactured using a hollow fiber membrane, high integration of the hollow fiber membrane having large contact surface area is possible, whereby it is possible to sufficiently humidify the fuel cell even at a small capacity, it is possible to use a low-priced material, and it is possible to collect moisture and heat included in off-gas discharged from the fuel cell at a high temperature and to reuse the collected moisture and heat through the humidifier.

FIG. 1 is a schematic exploded perspective view of a conventional humidifier for fuel cells.

As illustrated in FIG. 1, a conventional membrane humidification type humidifier 100 includes a humidifying module 110, in which moisture exchange is performed between air supplied from the outside and off-gas discharged from a fuel cell stack (not shown), and caps 120 coupled respectively to opposite ends of the humidifying module 110.

One of the caps 120 transmits air supplied from the outside to the humidifying module 110, and the other cap transmits air humidified by the humidifying module 110 to the fuel cell stack.

The humidifying module 110 includes a mid-case 111 having an off-gas inlet 111a and an off-gas outlet 111b and a plurality of hollow fiber membranes 112 in the mid-case 111. Opposite ends of a bundle of hollow fiber membranes 112 are potted in fixing layers 113. In general, each of the fixing layers 113 is formed by hardening a liquid polymer, such as liquid polyurethane resin, using a casting method.

Air supplied from the outside flows along hollow parts of the hollow fiber membranes 112. Off-gas introduced into the mid-case 111 through the off-gas inlet 111a comes into contact with the outer surfaces of the hollow fiber membranes 112, and is discharged from the mid-case 111 through the off-gas outlet 111b. When the off-gas comes into contact with the outer surfaces of the hollow fiber membranes 112, moisture contained in the off-gas is transmitted through the hollow fiber membranes 112 to humidify air flowing along the hollow parts of the hollow fiber membranes 112.

Inner spaces of the caps 120 must fluidly communicate with only the hollow parts of the hollow fiber membranes 112 in a state of being completely isolated from an inner space of the mid-case 111. If not, air leakage due to pressure difference occurs, whereby the amount of humidified air that is supplied to the fuel cell stack is reduced and power generation efficiency of a fuel cell is lowered.

In general, as illustrated in FIG. 1, the fixing layers 113, in which opposite ends of the hollow fiber membranes 112 are potted, and resin layers 114 provided between the fixing layers 113 and the mid-case 111 isolate the inner spaces of the caps 120 from the inner space of the mid-case 111. Similarly to the fixing layers 113, each of the resin layers 114 is generally formed by hardening a liquid polymer, such as liquid polyurethane resin, using a casting method.

However, a casting process for forming the resin layers 114 requires a relatively long process time, whereby productivity of the humidifier 100 is lowered.

DISCLOSURE

Technical Problem

The present disclosure has been made in view of the above problems, and it is an object of the present disclosure to provide a humidifier for fuel cells capable of preventing lowering in productivity of the humidifier due to formation of a resin layer through a casting process.

Technical Solution

In order to accomplish the above object, the present disclosure may include the following construction.

A humidifier for fuel cells according to the present disclosure may include a humidifying module configured to humidify dry gas supplied from outside using wet gas discharged from a fuel cell stack and a first cap coupled to one end of the humidifying module. The humidifying module may include a mid-case and at least one cartridge disposed in the mid-case, the cartridge being configured to receive a plurality of hollow fiber membranes. The humidifier for fuel cells according to the present disclosure may further include a first packing member airtightly coupled to at least one end of the humidifying module through mechanical assembly such that the first cap fluidly communicates with only the hollow fiber membranes. The first packing member may be brought into tight contact with the cartridge using pressure of at least one of dry gas and wet gas.

Advantageous Effects

The present disclosure is implemented such that a casting process for hermetically sealing an inner space of a cap and an inner space of a mid-case is omitted. In the present disclosure, therefore, it is possible to improve productivity through reduction in process time for production.

In the present disclosure, it is possible to increase hermetic sealing force using the pressure of at least one of dry gas and wet gas. Also, in the present disclosure, it is possible to increase hermetic sealing force without an additional construction, whereby it is possible to reduce cost necessary to increase hermetic sealing force.

DESCRIPTION OF DRAWINGS

FIG. 2 is a schematic exploded perspective view of a humidifier for fuel cells according to the present disclosure.

FIG. 3 is a schematic exploded sectional view showing the humidifier for fuel cells according to the present disclosure, taken along line I-I of FIG. 2.

FIG. 4 is a schematic coupled sectional view showing the humidifier for fuel cells according to the present disclosure, taken along line I-I of FIG. 2.

FIG. 5 is a schematic enlarged sectional view showing part A of FIG. 4.

FIGS. 6 to 9 are schematic enlarged sectional views showing a first packing member, taken along line I-I of FIG. 2.

FIG. 10 is a schematic exploded perspective view showing an embodiment in which two cartridges are coupled to a mid-case in the humidifier for fuel cells according to the present disclosure.

FIG. 11 is a schematic enlarged sectional view showing the first packing member, taken along line II-II of FIG. 10.

FIGS. 12 and 13 are schematic enlarged sectional views showing the state in which the first packing member and a second packing member are coupled to the mid-case and the cartridges, taken along line II-II of FIG. 10.

FIG. 14 is a schematic exploded perspective view showing an embodiment in which three cartridges are coupled to the mid-case in the humidifier for fuel cells according to the present disclosure.

FIG. 15 is a schematic enlarged sectional view showing part A of FIG. 4.

FIGS. 16 to 18 are schematic enlarged sectional views showing the first packing member, taken along line I-I of FIG. 2.

FIG. 19 is a schematic enlarged sectional view showing the state in which the first packing member and the second packing member are coupled to the mid-case and the cartridges, taken along line II-II of FIG. 10.

FIGS. 20 and 21 are schematic enlarged sectional views showing part A of FIG. 4.

FIGS. 22 to 24 are schematic enlarged sectional views showing the state in which the first packing member and the second packing member are coupled to the mid-case and the cartridges, taken along line II-II of FIG. 10.

BEST MODE

Figure 1:
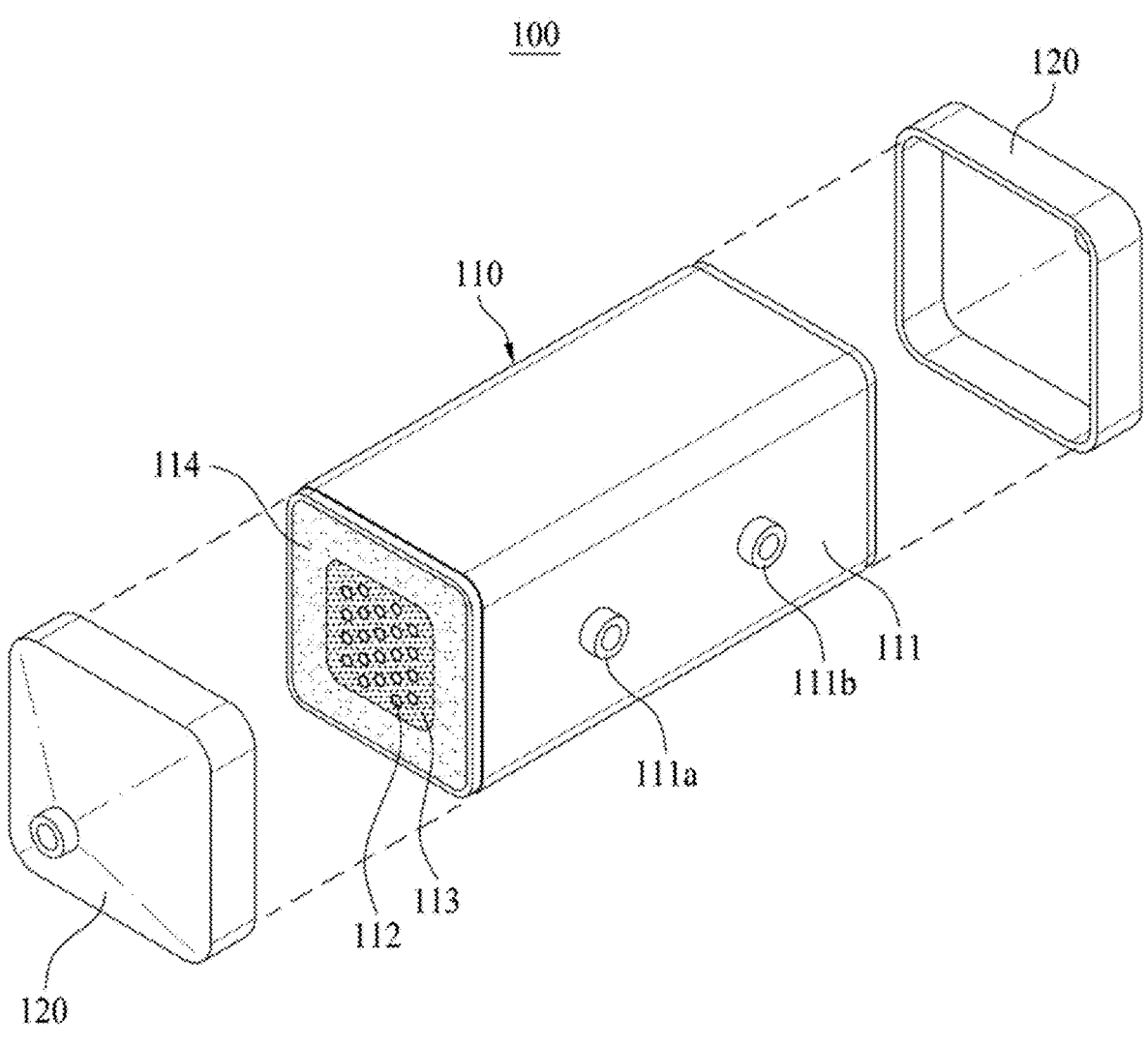
FIG. 1 is a schematic exploded perspective view of a conventional humidifier for fuel cells.

Hereinafter, embodiments of a humidifier for fuel cells according to the present disclosure will be described in detail with reference to the accompanying drawings.

Referring to FIGS. 2 to 4, a humidifier 1 for fuel cells according to the present disclosure humidifies dry gas supplied from the outside using wet gas discharged from a fuel cell stack. The dry gas may be fuel gas or air.

The humidifier 1 for fuel cells according to the present disclosure includes a humidifying module 2 configured to humidify dry gas and a first cap 3 coupled to one end of the humidifying module 2. The humidifying module 2 includes a cartridge 21, to which a plurality of hollow fiber membranes 211 is coupled, a mid-case 22, to which the cartridge 21 is coupled, and a first packing member 23 disposed between the cartridge 21 and the mid-case 22 to hermetically seal between the cartridge 21 and the mid-case 22. The first packing member 23 may hermetically seal between the cartridge 21 and the mid-case 22 through coupling without a casting process. Consequently, the first packing member 23 may hermetically seal an inner space of the first cap 3 and an inner space of the mid-case 22. In the humidifier 1 for fuel cells according to the present disclosure, therefore, the casting process, which requires a relatively long process time, may be omitted, whereby it is possible to improve productivity through reduction in process time for production.

Hereinafter, the humidifying module 2 and the first cap 3 will be described in detail with reference to the accompanying drawings.

Referring to FIGS. 2 to 4, the humidifying module 2 humidifies dry gas supplied from the outside using wet gas discharged from the fuel cell stack. The first cap 3 may be coupled to one end of the humidifying module 2. A second cap 4 may be coupled to the other end of the humidifying module 2. The first cap 3 may transmit dry gas supplied from the outside to the humidifying module 2. The second cap 4 may transmit the dry gas humidified by the humidifying module 2 to the fuel cell stack. The second cap 4 may transmit dry gas supplied from the outside to the humidifying module 2, and the first cap 3 may transmit the dry gas humidified by the humidifying module 2 to the fuel cell stack.

The humidifying module 2 includes the cartridge 21, the mid-case 22, and the first packing member 23.

The cartridge 21 includes the plurality of hollow fiber membranes 211. The hollow fiber membranes 211 may be implemented as the cartridge 21 so as to be modularized. Consequently, the hollow fiber membranes 211 may be installed in the mid-case 22 through a process of coupling the cartridge 21 to the mid-case 22. In the humidifier 1 for fuel cells according to the present disclosure, therefore, ease in installation, separation, and replacement of the hollow fiber membranes 211 may be improved. The cartridge 21 may include an inner case 210 configured to receive the hollow fiber membranes 211. The hollow fiber membranes 211 may be disposed in the inner case 210 so as to be modularized. Each of the hollow fiber membranes 211 may include a polymer membrane made of polysulfone resin, polyethersulfone resin, sulfonated polysulfone resin, polyvinylidene fluoride (PVDF) resin, polyacrylonitrile (PAN) resin, polyimide resin, polyamide imide resin, polyester imide resin, or a mixture of two or more thereof.

The cartridge 21 may include a first potting portion 212. The first potting portion 212 fixes the hollow fiber membranes 211. The first potting portion 212 may fix one side of each of the hollow fiber membranes 211. In this case, the first potting portion 212 may be formed so as not to block hollow portions of the hollow fiber membranes 211. The first potting portion 212 may be formed by hardening a liquid resin, such as liquid polyurethane resin, using a casting process. The first potting portion 212 may fix the inner case 210 and one side of each of the hollow fiber membranes 211 to each other.

The cartridge 21 may include a second potting portion 213. The second potting portion 213 fixes the other side of each of the hollow fiber membranes 211. In this case, the second potting portion 213 may be formed so as not to block the hollow portions of the hollow fiber membranes 211. Consequently, dry gas may be supplied to the hollow portions of the hollow fiber membranes 211, may be humidified, and may be supplied to the fuel cell stack without being disturbed by the second potting portion 213 and the first potting portion 212. The second potting portion 213 may be formed by hardening a liquid resin, such as liquid polyurethane resin, using a casting process. The second potting portion 213 may fix the inner case 210 and the other side of each of the hollow fiber membranes 211 to each other.

The cartridge 21 is coupled to the mid-case 22. The cartridge 21 may be disposed in the mid-case 22 such that a space is defined between the inner surface of the mid-case 22 and the outer surface of the cartridge 21. The mid-case 22 may include an inlet 221 and an outlet 222. Wet gas containing moisture may be introduced into the mid-case 22 through the inlet 221, and may then come into contact with the outer surfaces of the hollow fiber membranes 211. During this process, the moisture contained in the wet gas may be transmitted through the hollow fiber membranes 211, whereby the dry gas flowing along the hollow portions of the hollow fiber membranes 211 may be humidified. The humidified dry gas may be discharged from the hollow fiber membranes 211, and may then be supplied to the fuel cell stack. After humidifying the dry gas, the wet gas may be discharged from the mid-case 22 through the outlet 222. The inlet 221 may be connected to the fuel cell stack. In this case, the wet gas may be off-gas discharged from the fuel cell stack.

Meanwhile, the cartridge 21 may be provided with an introduction hole (not shown) configured to allow the wet gas to be introduced therethrough and a discharge hole (not shown) configured to allow the wet gas, after humidifying the dry gas flowing along the hollow portions of the hollow fiber membranes 211, to be discharged therethrough. In this case, the wet gas may be introduced between the inner surface of the mid-case 22 and the outer surface of the cartridge 21 through the inlet 221, may be introduced into the cartridge 21 through the introduction hole, may humidify the dry gas flowing along the hollow portions of the hollow fiber membranes 211, may be discharged between the inner surface of the mid-case 22 and the outer surface of the cartridge 21 through the discharge hole, and may be discharged from the mid-case 22 through the outlet 222.

Referring to FIGS. 2 to 6, the first packing member 23 hermetically seals between the cartridge 21 and the mid-case 22. The first packing member 23 may be airtightly coupled to at least one end of the humidifying module 2 through mechanical assembly. Consequently, the first packing member 23 allows the first cap 3 to fluidly communicate with only the hollow fiber membranes 112. Consequently, the first packing member 23 may prevent direct mixing between dry gas to be supplied to the fuel cell stack and wet gas supplied into the mid-case 22. The first packing member 23 may be inserted between the cartridge 21 and the mid-case 22. In this case, the cartridge 21 may be inserted into a first passing hole 23a formed in the first packing member 23. The first packing member 23 may contact each of an inner wall of the mid-case 22, an outer wall of the cartridge 21, and the first potting portion 212. Through such contact, the first packing member 23 may be airtightly coupled to one end of the humidifying module 2. In this case, the first packing member 23 may contact each of a portion of the inner wall of the mid-case 22, a portion of the outer wall of the cartridge 21, and a portion of the first potting portion 212.

The humidifier 1 for fuel cells according to the present disclosure may include a plurality of first packing members 23. The first packing members 23 and 23' may be airtightly coupled to opposite ends of the humidifying module 2, respectively. In this case, the first packing members 23 and 23' may be disposed at opposite sides of the cartridge 21. The first packing member 23' may contact each of the inner wall of the mid-case 22, the outer wall of the cartridge 21, and the second potting portion 213, whereby the first packing member 23' may be airtightly coupled to the other end of the humidifying module 2. In this case, the first packing member 23' may contact each of a portion of the inner wall of the mid-case 22, a portion of the outer wall of the cartridge 21, and a portion of the second potting portion 213. Since the first packing members 23 and 23' are implemented so as to have the same structure except that the positions thereof are different from each other, a description will be given based on the first packing member 23 disposed at one end of the humidifying module 2. It is obvious to those skilled in the art to which the present disclosure pertains that the first packing member 23' disposed at the other end of the humidifying module 2 is derived therefrom.

The first packing member 23 may be brought into tight contact with the cartridge 21 using the pressure of at least one of dry gas and wet gas. During a humidification process, both the dry gas and wet gas flow at a considerable pressure, whereby each of the dry gas and the wet gas has pressure sufficient to press the first packing member 23 toward the cartridge 21. Consequently, the humidifier 1 for fuel cells according to the present disclosure is implemented such that the first packing member 23 is brought into tight contact with the cartridge 21 using the pressure of at least one of the dry gas and the wet gas during the humidification process. In the humidifier 1 for fuel cells according to the present disclosure, therefore, it is possible to implement hermetic sealing force necessary to prevent direct mixing between the dry gas and the wet gas without an additional construction, whereby it is possible to reduce cost necessary to increase hermetic sealing force. The first packing member 23 may be made of an elastically deformable material. For example, the first packing member 23 may be made of rubber. The first packing member 23 may be formed in a ring shape so as to hermetically seal between the cartridge 21 and the mid-case 22.

The first packing member 23 may include a first packing body 230. The first packing body 230 defines the overall external appearance of the first packing member 23. When the first packing body 230 is inserted between the cartridge 21 and the mid-case 22, a first outer surface 230*a* of the first packing body 230 may be disposed so as to face the first cap 3. In this case, a first inner surface 230*b* of the first packing body 230 may be disposed so as to face the interior of the mid-case 22. The first inner surface 230*b* and the first outer surface 230*a* may be disposed so as to face in opposite directions.

The first packing member 23 may include a first outer groove 231 and a first outer member 232.

The first outer groove 231 receives dry gas. The first outer groove 231 may be formed in the first outer surface 230*a*. Consequently, the first outer groove 231 may be disposed so as to face the first cap 3, and therefore the first outer groove may receive dry gas located between the first cap 3 and the cartridge 21.

The first outer member 232 contacts the cartridge 21 between the first outer groove 231 and the cartridge 21. Depending on the pressure of the dry gas received in the first outer groove 231, the first outer member 232 may be pressed toward the cartridge 21, and therefore the first outer member may be brought into tight contact with the cartridge 21. In the humidifier 1 for fuel cells according to the present disclosure, therefore, it is possible to increase hermetic sealing force between the first packing member 23 and the cartridge 21 using the pressure of the dry gas received in the first outer groove 231. The first outer member 232 may be brought into tight contact with the first potting portion 212.

The first packing member 23 may include a first outer protrusion 233. The first outer protrusion 233 contacts the mid-case 22 between the first outer groove 231 and the mid-case 22. Depending on the pressure of the dry gas received in the first outer groove 231, the first outer protrusion 233 may be pressed toward the mid-case 22, and therefore the first outer protrusion may be brought into tight contact with the mid-case 22. In the humidifier 1 for fuel cells according to the present disclosure, therefore, it is possible to increase hermetic sealing force between the first packing member 23 and the mid-case 22 using the pressure of the dry gas received in the first outer groove 231.

When the first packing member 23 includes both the first outer member 232 and the first outer protrusion 233, the first outer groove 231 may be disposed between the first outer member 232 and the first outer protrusion 233 in a first-axis direction (X-axis direction). Consequently, the pressure of the dry gas received in the first outer groove 231 may act in a direction in which the distance between the first outer member 232 and the first outer protrusion 233 is increased. Using the pressure of the dry gas received in the first outer groove 231, therefore, the first outer member 232 may be brought into tight contact with the cartridge 21, and the first outer protrusion 233 may be brought into tight contact with the mid-case 22. The first outer member 232, the first outer protrusion 233, and the first packing body 230 may be integrally formed.

The first packing member 23 may include a first inner groove 234 and a first inner member 235.

The first inner groove 234 receives wet gas. The first inner groove 234 may be formed in the first inner surface 230*b*. Consequently, the first inner groove 234 may be disposed so as to face the interior of the mid-case 22, and therefore the first inner groove may receive wet gas located in the mid-case 22. In this case, wet gas located between the inner surface of the mid-case 22 and the outer surface of the cartridge 21 may be received in the first inner groove 234.

The first inner member 235 contacts the cartridge 21 between the first inner groove 234 and the cartridge 21. Depending on the pressure of the wet gas received in the first inner groove 234, the first inner member 235 may be pressed toward the cartridge 211, and therefore the first inner member may be brought into tight contact with the cartridge 21. In the humidifier 1 for fuel cells according to the present disclosure, therefore, it is possible to increase hermetic sealing force between the first packing member 23 and the cartridge 21 using the pressure of the wet gas received in the first inner groove 234. The first inner member 235 may be brought into tight contact with the inner case 210. A portion of the first inner member 235 may be brought into tight contact with the first potting portion 212, and a portion of the first inner member may also be brought into tight contact with the inner case 210.

The first packing member 23 may include a first inner protrusion 236. The first inner protrusion 236 contacts the mid-case 22 between the first inner groove 234 and the mid-case 22. Depending on the pressure of the wet gas received in the first inner groove 234, the first inner protrusion 236 may be pressed toward the mid-case 22, and therefore the first inner protrusion may be brought into tight contact with the mid-case 22. In the humidifier 1 for fuel cells according to the present disclosure, therefore, it is possible to increase hermetic sealing force between the first packing member 23 and the mid-case 22 using the pressure of the wet gas received in the first inner groove 234.

When the first packing member 23 includes both the first inner member 235 and the first inner protrusion 236, the first inner groove 234 may be disposed between the first inner member 235 and the first inner protrusion 236. Consequently, the pressure of the wet gas received in the first inner groove 234 may act in a direction in which the distance between the first inner member 235 and the first inner protrusion 236 is increased. Using the pressure of the wet gas received in the first inner groove 234, therefore, the first inner member 235 may be brought into tight contact with the cartridge 21, and the first inner protrusion 236 may be brought into tight contact with the mid-case 22. The first inner member 235, the first inner protrusion 236, and the first packing body 230 may be integrally formed.

The first packing member 23 may include an extension member 237 and a catching member 238.

The extension member 237 extends toward the mid-case 22. The extension member 237 may extend from the first outer protrusion 233 toward the mid-case 22. The extension member 237 may be supported by the mid-case 22. The extension member 237 may connect the catching member 238 and the first outer protrusion 233 to each other. The extension member 237, the catching member 238, the first outer protrusion 233, and the first packing body 230 may be integrally formed. The extension member 237 may extend from the first packing body 230 toward the mid-case 22.

A catching groove 237a may be formed in the extension member 237. The catching groove 237a may be disposed between the first outer protrusion 233 and the catching member 238. The mid-case 22 may be inserted into the catching groove 237a.

The catching member 238 is coupled to the extension member 237. The catching member 238 may be disposed outside of the mid-case 22 inserted into the catching groove 237a. In this case, the mid-case 22 may be disposed between the catching member 238 and the first outer protrusion 233. The mid-case 22 may also be disposed between the catching member 238 and the first packing body 230.

Since the first packing member 23 is coupled to the mid-case 22 by catching, as described above, the depth by which the first packing member 23 is inserted into the mid-case 22 may be limited during the process of increasing hermetic sealing force using the pressure of at least one of the dry gas and the wet gas. In the humidifier 1 for fuel cells according to the present disclosure, therefore, it is possible to improve stability in increasing hermetic sealing force using the pressure of at least one of the dry gas and the wet gas.

Referring to FIG. 7, the first packing member 23 may include a first reinforcement member 239. The first reinforcement member 239 may be disposed in the first packing body 230. The first reinforcement member 239 may be made of a material that has higher rigidity than the first packing body 230. For example, the first reinforcement member 239 may be made of metal or plastic. The first reinforcement member 239 may be implemented so as to be disposed in the first packing body 230 by insert molding.

As shown in FIGS. 5 to 7, the first packing member 23 may be implemented so as to include all of the first outer groove 231, the first outer member 232, the first outer protrusion 233, the first inner groove 234, the first inner member 235, and the first inner protrusion 236. As shown in FIG. 8, the first packing member 23 may be implemented so as to include only the first outer groove 231, the first outer member 232, and the first outer protrusion 233. As shown in FIG. 9, the first packing member 23 may be implemented so as to include only the first inner groove 234, the first inner member 235, and the first inner protrusion 236.

Referring to FIGS. 2 to 9, the first cap 3 is coupled to one end of the humidifying module 2. The space between the first cap 3 and the cartridge 21 may be isolated from the space between the cartridge 21 and the mid-case 22 in a hermetically sealed state by the first packing member 23.

The first cap 3 may include a first pushing member 31. When the first cap 3 is coupled to one end of the humidifying module 2, the first pushing member 31 may push the extension member 237 toward the mid-case 22. Consequently, the first pushing member 31 may further increase fixing force necessary for the first packing member 23 to be maintained in a state of hermetically sealing between the cartridge 21 and the mid-case 22.

Referring to FIGS. 2 to 4, the second cap 4 is coupled to the other end of the humidifying module 2. The space between the second cap 4 and the cartridge 21 may be isolated from the space between the cartridge 21 and the mid-case 22 in a hermetically sealed state by the first packing member 23'. The first packing member 23' is approximately identical to the first packing member 23 described above, and a detailed description thereof will be omitted.

Referring to FIGS. 10 to 13, the humidifier 1 for fuel cells according to the present disclosure may be implemented such that a plurality of cartridges 21 is coupled in the mid-case 22. In this case, the mid-case 22 may include a partition member (not shown) disposed between the cartridges 21 and 21'. The cartridges 21 and 21' may be individually detachably coupled to the mid-case 22 in a state of being disposed between the partition members. Meanwhile, in FIGS. 11 to 13, only the first potting portion is shown with omission of a plurality of hollow fiber membranes and an inner case, although each of the cartridges 21 and 21' includes the plurality of hollow fiber membranes and the inner case.

When the humidifying module 2 is implemented such that the plurality of cartridges 21 is coupled to the mid-case 22, the humidifying module may include a second packing member 24.

The second packing member 24 is disposed between the cartridges 21 and 21' to hermetically seal between the cartridges 21 and 21'. The second packing member 24 may prevent direct mixing between dry gas and wet gas through the space between the cartridges 21 and 21'. The humidifier 1 for fuel cells according to the present disclosure may include a plurality of second packing members 24. The second packing members 24 and 24' may be disposed at opposite sides of the cartridges 21 and 21'. Since the second packing members 24 and 24' are implemented so as to have the same structure except that the positions thereof are different from each other, a description will be given based on the second packing member 24 disposed at one side of each of the cartridges 21 and 21'. It is obvious to those skilled in the art to which the present disclosure pertains that the second packing member 24' disposed at the other side of each of the cartridges 21 and 21' is derived therefrom.

The second packing member 24 may be brought into tight contact with the cartridges 21 and 21' using the pressure of at least one of dry gas and wet gas. In the humidifier 1 for fuel cells according to the present disclosure, therefore, it is possible to implement hermetic sealing force necessary to prevent direct mixing between the dry gas and the wet gas through the space between the cartridges 21 and 21' without an additional construction, whereby it is possible to reduce cost necessary to increase hermetic sealing force. The second packing member 24 may be made of an elastically deformable material. For example, the second packing member 24 may be made of rubber.

The second packing member 24 may include a second packing body 240. The second packing body 240 defines the overall external appearance of the second packing member 24. When the second packing body 240 is inserted between the cartridges 21 and 21', a second outer surface 240a of the second packing body 240 may be disposed so as to face the first cap 3. In this case, a second inner surface 240b of the second packing body 240 may be disposed so as to face the interior of the mid-case 22. When a partition member is provided in the mid-case 22, the second inner surface 240b may be disposed so as to face the partition member. The second inner surface 240b and the second outer surface 240a may be disposed so as to face in opposite directions.

The second packing member 24 may include a second outer groove 241 and a plurality of second outer members 242 and 242'.

The second outer groove 241 receives dry gas. The second outer groove 241 may be formed in the second outer surface 240a. Consequently, the second outer groove 241 may be disposed so as to face the first cap 3, and therefore the first outer groove may receive dry gas located between the first cap 3 and the cartridge 21.

The second outer members 242 and 242' contact the cartridges 21 and 21' between the second outer groove 241 and the cartridges 21 and 21'. Depending on the pressure of the dry gas received in the second outer groove 241, the second outer members 242 and 242' may be pressed toward the cartridges 21 and 21', and therefore the second outer members may be brought into tight contact with the cartridges 21 and 21', respectively. In the humidifier 1 for fuel cells according to the present disclosure, therefore, it is possible to increase hermetic sealing force between the second packing member 24 and the cartridges 21 and 21' using the pressure of the dry gas received in the second outer groove 241. The second outer members 242 and 242' may be brought into tight contact with the first potting portion 212. The second outer groove 241 may be disposed between the second outer members 242 and 242'. Consequently, the pressure of the dry gas received in the second outer groove 241 may act in a direction in which the distance between the second outer members 242 and 242' is increased. The second outer members 242 and 242' and the second packing body 240 may be integrally formed.

The second packing member 24 may include a second inner groove 243 and second inner members 244 and 244'.

The second inner groove 243 receives wet gas. The second inner groove 243 may formed in the second inner surface 240b. Consequently, the second inner groove 243 may disposed so as to face the interior of the mid-case 22, and therefore the first inner groove may receive wet gas located in the mid-case 22. In this case, wet gas located between the outer surfaces of the cartridges 21 and 21' may be received in the second inner groove 243.

The second inner members 244 and 244' contact the cartridges 21 and 21' between the second inner groove 243 and the cartridges 21 and 21'. Depending on the pressure of the wet gas received in the second inner groove 243, the second inner members 244 and 244' may be pressed toward the cartridges 21 and 21', and therefore the second inner members may be brought into tight contact with the cartridges 21 and 21', respectively. In the humidifier 1 for fuel cells according to the present disclosure, therefore, it is possible to increase hermetic sealing force between the second packing member 24 and the cartridges 21 and 21' using the pressure of the wet gas received in the second inner groove 243. The second inner members 244 and 244' may be brought into tight contact with the inner cases 210 of the cartridges 21 and 21', respectively. A portion of each of the second inner members 244 and 244' may be brought into tight contact with a corresponding one of the first potting portions 212 and 212' of the cartridges 21 and 21', and a portion of each of the second inner members may be brought into tight contact with a corresponding one of the inner cases 210 of the cartridges 21 and 21'. The second inner groove 243 may be disposed between the second inner members 244 and 244'. Consequently, the pressure of the wet gas received in the second inner groove 243 may act in a direction in which the distance between the second inner members 244 and 244' is increased. The second inner members 244 and 244' and the second packing body 240 may be integrally formed.

Here, the second packing member 24 and the first packing member 23 may be integrally formed. Consequently, the second packing member 24 and the first packing member 23 may be installed through single insertion. In the humidifier 1 for fuel cells according to the present disclosure, therefore, it is possible to improve ease in hermetically sealing between the mid-case 22 and the cartridge 21 and between the cartridges 21 even when the plurality of cartridges 21 is coupled to the mid-case 22.

Referring to FIG. 13, the second packing member 24 may include a second reinforcement member 245. The second reinforcement member 245 may be disposed in the second packing body 240. The second reinforcement member 245 may be made of a material that has higher rigidity than the second packing body 240. For example, the second reinforcement member 245 may be made of metal or plastic. The second reinforcement member 245 may be implemented so as to be disposed in the second packing body 240 by insert molding.

As shown in FIGS. 11 to 13, the second packing member 24 may be implemented so as to include all of the second outer groove 241, the second outer members 242 and 242', the second inner groove 243, and the second inner members 244 and 244'. Although not shown, the second packing member 24 may be implemented so as to include only the second outer groove 241 and the second outer members 242 and 242'. Although not shown, the second packing member 24 may be implemented so as to include only the second inner groove 243 and the second inner members 244 and 244'.

FIGS. 10 to 13 show that two cartridges 21 are coupled to the mid-case 22. However, the present disclosure is not limited thereto. As shown in FIG. 14, the humidifier 1 for fuel cells according to the present disclosure may be implemented such that three cartridges 21, 21', and 21" are coupled to the mid-case 22. In this case, two second packing members 24 may be provided at one side of the humidifying module 2, and two second packing members 24' may be provided at the other side of the humidifying module 2. Although not shown, the humidifier 1 for fuel cells according to the present disclosure may be implemented such that four or more cartridges 21 are coupled to the mid-case 22. In this case, the number of second packing members 24 and 24' may be increased in proportion to the number of cartridges 21 coupled to the mid-case 22.

Referring to FIGS. 15 and 16, the humidifying module 2 may include a first elastic member 25. In this case, the first packing member 23 may be brought into tight contact with the cartridge 21 using elastic force of the first elastic member 25. In the humidifier 1 for fuel cells according to the present disclosure, therefore, it is possible to increase hermetic sealing force necessary to prevent direct mixing between the dry gas and the wet gas using the first elastic member 25. In the humidifier 1 for fuel cells according to the present disclosure, therefore, it is possible to improve stability in humidifying the dry gas.

The first elastic member 25 is coupled to the first packing member 23. The first elastic member 25 may bring the first packing member 23 into tight contact with the cartridge 21 using elastic force thereof. The first elastic member 25 may be implemented as a spring having elastic force. The first elastic member 25 may be formed in a ring shape.

The first elastic member 25 may be inserted into the first outer groove 231. In this case, the first elastic member 25 may press the first outer member 232 toward the cartridge 21 using elastic force thereof, whereby the first outer member 232 may be brought into tight contact with the cartridge 21. In the humidifier 1 for fuel cells according to the present disclosure, therefore, it is possible to increase hermetic sealing force between the first packing member 23 and the cartridge 21 using the elastic force of the first elastic member 25. In this case, the first outer member 232 may be pressed toward the cartridge 21 by the elastic force of the first elastic member 25, and therefore the first outer member may be brought into tight contact with the cartridge 21. The first outer member 232 may be brought into tight contact with the first potting portion 212.

When the first packing member 23 includes the first outer groove 231 and the first outer member 232, the first packing member 23 may be brought into tight contact with the cartridge 21 using the pressure of dry gas. During the humidification process, both the dry gas and the wet gas flow at a considerable pressure, whereby the dry gas has pressure sufficient to press the first packing member 23 toward the cartridge 21. Consequently, the humidifier 1 for fuel cells according to the present disclosure is implemented such that the first packing member 23 is brought into tighter contact with the cartridge 21 using the pressure of the dry gas during the humidification process, in addition to using the elastic force of the first elastic member 25. In the humidifier 1 for fuel cells according to the present disclosure, therefore, it is possible to further increase hermetic sealing force necessary to prevent direct mixing between the dry gas and the wet gas. Also, in the humidifier 1 for fuel cells according to the present disclosure, it is possible to further increase hermetic sealing force without an additional construction, since the pressure of the dry gas is used. In the humidifier 1 for fuel cells according to the present disclosure, therefore, it is possible to reduce cost necessary to further increase hermetic sealing force.

When the first packing member 23 is brought into tight contact with the cartridge 21 using the elastic force of the first elastic member 25 and the pressure of the dry gas, as described above, the first outer groove 231 may receive the dry gas located between the first cap 3 and the cartridge 21. The first outer member 232 may be pressed toward cartridge 21 depending on the pressure of the dry gas received in the first outer groove 231, whereby the first outer member may be brought into tight contact with the cartridge 21.

As shown in FIG. 16, the first elastic member 25 may be disposed in the first packing body 230. In this case, the first elastic member 25 may press the first packing body 230 toward the cartridge 21 using the elastic force thereof, whereby the first packing body 230 may be brought into tight contact with the cartridge 21. Consequently, the humidifier 1 for fuel cells according to the present disclosure is implemented such that the first outer member 232 is brought into tight contact with the cartridge 21 using the pressure of the dry gas received in the first outer groove 231 and such that the first packing body 230 is brought into tight contact with the cartridge 21 using the elastic force of the first elastic member 25. In the humidifier 1 for fuel cells according to the present disclosure, therefore, different portions of the first packing member 23 may be brought into tight contact with the cartridge 21, whereby it is possible to increase hermetic sealing force through a dual structure. The first elastic member 25 may be implemented so as to be disposed in the first packing body 230 by insert molding.

Referring to FIG. 17, the first elastic member 25 may be disposed at the first inner surface 230*b* such that the first packing member 23 is brought into tight contact with the cartridge 21. The first elastic member 25 may be inserted into the first inner groove 234 so as to contact the first inner member 235. Consequently, the first elastic member 25 may bring the first inner member 235 into tight contact with the cartridge 21 using the elastic force thereof. In the humidifier 1 for fuel cells according to the present disclosure, therefore, it is possible to increase hermetic sealing force between the first packing member 23 and the cartridge 21 using the elastic force of the first elastic member 25. In this case, the first inner member 235 may be pressed toward the cartridge 21 by the elastic force of the first elastic member 25, whereby the first inner member may be brought into tight contact with the cartridge 21. The first inner member 235 may be brought into tight contact with the inner case 210. A portion of the first inner member 235 may be brought into tight contact with the first potting portion 212, and a portion of the first inner member may be brought into tight contact with the inner case 210.

When the first packing member 23 includes the first inner groove 234 and the first inner member 235, the first packing member 23 may be brought into tight contact with the cartridge 21 using the pressure of wet gas. Consequently, the humidifier 1 for fuel cells according to the present disclosure is implemented such that the first packing member 23 is brought into tighter contact with the cartridge 21 using the pressure of the wet gas during the humidification process, in addition to using the elastic force of the first elastic member 25.

When the first packing member 23 is brought into tight contact with the cartridge 21 using the elastic force of the first elastic member 25 and the pressure of the wet gas, as described above, the first inner groove 234 may receive the wet gas located between the first cap 3 and the cartridge 21. The first inner member 235 may be pressed toward the cartridge 21 depending on the pressure of the wet gas received in the first inner groove 234, whereby the first inner member may be brought into tight contact with the cartridge 21.

Although not shown, the first packing member 23 may also be implemented such that the first outer member 232 is brought into tight contact with the cartridge 21 by the elastic force of the first elastic member 25 disposed in the first outer groove 231 and such that the first inner member 235 is brought into tight contact with the cartridge 21 by the pressure of the wet gas received in the first inner groove 234. In this case, the first outer member 232 may also be brought into tight contact with the cartridge 21 by the elastic force of the first elastic member 25 and the pressure of the dry gas received in the first outer groove 231.

Although not shown, the first packing member 23 may also be implemented such that the first inner member 235 is brought into tight contact with the cartridge 21 by the elastic force of the first elastic member 25 disposed in the first outer groove 231 and such that the first outer member 232 is brought into tight contact with the cartridge 21 by the pressure of the dry gas received in the first outer groove 231. In this case, the first inner member 235 may also be brought into tight contact with the cartridge 21 by the elastic force of the first elastic member 25 and the pressure of the wet gas received in the first inner groove 234.

Although not shown, the first packing member 23 may also be implemented such that the first packing body 230 is brought into tight contact with the cartridge 21 by the elastic force of the first elastic member 25 disposed in the first packing body 230 and such that the first inner member 235 is brought into tight contact with the cartridge 21 by the pressure of the wet gas received in the first inner groove 234.

Although not shown, the first packing member 23 may also be implemented such that the first packing body 230 is brought into tight contact with the cartridge 21 by the elastic force of the first elastic member 25 disposed in the first packing body 230, such that the first outer member 232 is brought into tight contact with the cartridge 21 by the pressure of the dry gas received in the first outer groove 231, and such that the first inner member 235 is brought into tight contact with the cartridge 21 by the pressure of the wet gas received in the first inner groove 234.

Referring to FIG. 18, the humidifying module 2 may include a second elastic member 26.

The second elastic member 26 is coupled to the first packing member 23. The second elastic member 26 may bring the first packing member 23 into tight contact with the cartridge 21 using elastic force thereof. The second elastic member 26 may be implemented as a spring having elastic force. The second elastic member 26 may be formed in a ring shape.

The second elastic member 26 may be inserted into the first inner groove 234. In this case, the second elastic member 26 may press the first inner member 235 toward the cartridge 21 using elastic force thereof, whereby the first inner member 235 may be brought into tight contact with the cartridge 21. In this case, the first elastic member 25 may bring the first outer member 232 into contact with the cartridge 21 using the elastic force thereof in a state of being disposed in the first outer groove 231.

In the humidifier 1 for fuel cells according to the present disclosure, therefore, the first inner member 235 and the first outer member 232 may be brought into tight contact with the cartridge 21 using the elastic force of the second elastic member 26 and the elastic force of the first elastic member 25. In the humidifier 1 for fuel cells according to the present disclosure, therefore, different portions of the first packing member 23 may be brought into tight contact with the cartridge 21, whereby it is possible to increase hermetic sealing force through a dual structure. In this case, the first inner member 235 may be brought into tighter contact with the cartridge 21 by the elastic force of the second elastic member 26 and the pressure of the wet gas received in the first inner groove 234. The first outer member 232 may be brought into tighter contact with the cartridge 21 by the elastic force of the first elastic member 25 and the pressure of the dry gas received in the first outer groove 231.

Although not shown, one of the second elastic member 26 and the first elastic member 25 may be disposed in the first packing body 230, and the other elastic member may be disposed in one of the first inner groove 234 and the first outer groove 231.

Referring to FIGS. 10 and 19, the humidifying module 2 may include a plurality of first elastic members 25. The first elastic members 25 and 25' may be inserted respectively into the first outer groove 231 and the second outer groove 241 to bring the first packing member 23 and the second packing member 24 into tight contact with the cartridges 21 and 21', respectively. The first elastic members 25 and 25' may be disposed so as to surround the cartridges 21 and 21', respectively, to elastically press the first packing member 23 and the second packing member 24 toward the cartridges 21 and 21', respectively. Consequently, the humidifier 1 for fuel cells according to the present disclosure is implemented such that the first packing member 23 and the second packing member 24 are brought into tight contact with the cartridges 21 and 21', respectively, using the pressure of the dry gas received in the first outer groove 231 and the second outer groove 241 and the elastic force of the first elastic members 25 and 25'. In the humidifier 1 for fuel cells according to the present disclosure, therefore, it is possible to increase hermetic sealing force through a dual structure.

The humidifying module 2 may further include a plurality of second elastic members 26, in addition to the first elastic members 25 and 25'. The second elastic members 26 and 26' may be inserted respectively into the first inner groove 234 and the second inner groove 243 to bring the first packing member 23 and the second packing member 24 into tight contact with the cartridges 21 and 21', respectively. The second elastic members 26 and 26' may be disposed so as to surround the cartridges 21 and 21', respectively, to elastically press the first packing member 23 and the second packing member 24 toward the cartridges 21 and 21', respectively. Consequently, the humidifier 1 for fuel cells according to the present disclosure is implemented such that the first packing member 23 and the second packing member 24 are brought into tight contact with the cartridges 21 and 21', respectively, using the pressure of the dry gas received in the first inner groove 234 and the second inner groove 243 and the elastic force of the second elastic members 26 and 26'. In the humidifier 1 for fuel cells according to the present disclosure, therefore, it is possible to further increase hermetic sealing force.

Although not shown, the humidifying module 2 may be implemented such that the first elastic members 25 and 25' are inserted respectively into the first inner groove 234 and the second inner groove 243 to bring the first packing member 23 and the second packing member 24 into tight contact with the cartridges 21 and 21', respectively. The first elastic members 25 and 25' may be inserted respectively into the first inner groove 234 and the second inner groove 243 so as to surround the cartridges 21 and 21', respectively, whereby the first packing member 23 and the second packing member 24 may be elastically pressed toward the cartridges 21 and 21', respectively.

Referring to FIGS. 2, 20, and 21, the cartridge 21 may include a first support 214. The first packing member 23 may be implemented so as to be brought into tight contact with the cartridge 21 in a state of being compressed through interference fit using the first support 214.

The first support 214 may be coupled to the first potting portion 212. The first support 214 may be disposed so as to surround the periphery of the first potting portion 212. As a result, the first potting portion 212 may be disposed inside the first support 214. The first support 214 may be formed in a ring shape. The first support 214 may be disposed so as to protrude to the outside of the first potting portion 212. During insertion of the first packing member 23 between the mid-case 22 and the cartridge 21, therefore, the portion of the first packing member 23 disposed between the mid-case 22 and the first support 214 may be compressed as the result of interference fit. Consequently, it is possible to further increase hermetic sealing force using the first packing member 23.

The first support 214 may be supported by the inner case 210 through hook coupling such that movement of the first support in a second-axis direction (Y-axis direction) is limited. The second-axis direction (Y-axis direction) is an axis direction perpendicular to the first-axis direction (X-axis direction) and is an axis direction parallel to a direction in which the first cap 3 and the second cap 4 are spaced apart from each other. In the state in which the first support 214 is coupled to the inner case 210, the first potting portion 212 may be formed through a casting process, whereby the first support 214 may be implemented so as to be coupled to the first potting portion 212. Afterwards, the first packing member 23 may be inserted between the cartridge 21 and the mid-case 22. The first support 214 may be made of a material that has higher rigidity than the first packing member 23. For example, the first support 214 may be made of metal or plastic.

The first support 214 may be implemented so as to be shorter than the first packing member 23 in the second-axis direction (Y-axis direction). For example, as shown in FIG. 20, the first support 214 may be implemented such that the first support 214 is not present between the first outer member 232 and the first potting portion 212 but is present only between the first packing body 230 and the first potting portion 212. Consequently, the first outer member 232 may be pressed by the pressure of the dry gas received in the first outer groove 231, whereby the first outer member may be brought into tight contact with the first potting portion 212. The first packing body 230 may be compressed between the mid-case 22 and the first support 214 as the result of interference fit, whereby the first packing body may be brought into tight contact with the first support 214.

The first support 214 may be implemented so as to have the same length as the first packing member 23 or to have a larger length than the first packing member 23 in the second-axis direction (Y-axis direction). For example, as shown in FIG. 21, the first support 214 may be implemented such that the first support 214 is present between the first outer member 232 and the first potting portion 212 and is also present between the first packing body 230 and the first potting portion 212. Consequently, the first outer member 232 and the first packing body 230 may be compressed between the mid-case 22 and the first support 214 as the result of interference fit, whereby the first outer member and the first packing body may be brought into tight contact with the first support 214. In this case, the first outer member 232 may be brought into tight contact with the cartridge 21 by both pressing by the first support 214 and the pressure of the dry gas received in the first outer groove 231.

When the first support 214 is implemented so as to contact both the first outer member 232 and the first packing body 230, the first support 214 may be used as a potting cap during formation of the first potting portion 212 through a casting process. In this case, as indicated by a dotted line in FIG. 21, the first potting portion 212 is formed through a casting process in the state in which the first support 214 is coupled to the inner case 210 so as to be implemented as a potting cap, and then the cartridge 21 may be manufactured through a cutting process of cutting a portion CP of the first support 214 and a portion of the first potting portion 212 such that the hollow portions of the hollow fiber membranes 211 are opened. In an embodiment in which the first support 214 is used as the potting cap, a potting cap assembly process and a potting cap removal process may be omitted, compared to a comparative example using a separate potting cap. In the embodiment in which the first support 214 is used as the potting cap, therefore, it is possible to reduce manufacturing cost and to improve productivity through shortening of a manufacturing time.

The cartridge 21 may include a second support (not shown). The second support may be coupled to the second potting portion 213. Since the second support and the first support 214 are implemented so as to have the same structure except that the positions thereof are different from each other, it is obvious to those skilled in the art to which the present disclosure pertains that the structure of the second support can be understood from the description of the first support 214. Therefore, a detailed description of the second support will be omitted.

Referring to FIGS. 2 and 21, the first cap 3 may include a first pushing protrusion 32. The first pushing protrusion 32 protrudes from the first pushing member 31. When the first cap 3 is coupled to one end of the humidifying module 2, the first pushing protrusion 32 may push the extension member 237 toward the mid-case 22, whereby the extension member 237 may be brought into tight contact with the mid-case 22. Consequently, the first pushing protrusion 32 may further increase hermetic sealing force between the first cap 3 and the mid-case 22 and may further increase force that fixes the first packing member 23. The first pushing protrusion 32 may be formed such that the size of the first pushing protrusion is gradually decreased as the first pushing protrusion protrudes from the first pushing member 31. The first pushing protrusion 32 may be formed in a ring shape.

The first cap 3 may include a first supporting member 33. The first supporting member 33 may be inserted into the first outer groove 231 to support the first packing body 230. Consequently, the first supporting member 33 may limit movement of the first packing member 23, whereby it is possible to prevent separation of the first packing member 23 due to vibration and shaking. The first supporting member 33 may be formed so as to have a length capable of pressing the first packing body 230. In this case, the first supporting member 33 may press the first packing body 230 such that the first outer groove 231 is maintained in a state of having a size sufficient to receive a fluid for cells. In addition, the first supporting member 33 may press the first packing body 230 in order to further increase tight contact force by which the first packing member 23 is brought into tight contact with the cartridge 21. The first supporting member 33 may be formed in a ring shape.

Although not shown, the second cap 4 may include a second pushing member, a second pushing protrusion, and a second supporting member. The second pushing member, the second pushing protrusion, and the second supporting member are implemented so as to be approximately identical respectively to the first pushing member 31, the first pushing protrusion 32, and the first supporting member 33 described above, and therefore a detailed description thereof will be omitted.

Referring to FIGS. 22 to 24, when the humidifying module 2 includes a plurality of cartridges 21 and 21', the cartridges 21 and 21' may include the first supports 214 and 214', respectively. Each of the first supports 214 and 214' may be disposed so as to surround the periphery of a corresponding one of the cartridges 21 and 21'. During insertion of the second packing member 24 between the cartridges 21 and 21', therefore, the portion of the second packing member 24 disposed between the first supports 214 and 214' may be extruded as the result of interference fit. Consequently, hermetic sealing force using the second packing member 24 may be further increased. Each of the first supports 214 and 214' may be made of a material that has higher rigidity than the second packing member 24. For example, each of the first supports 214 and 214' may be made of metal or plastic.

Each of the first supports 214 and 214' may be implemented so as to be shorter than the second packing member 24 in the second-axis direction (Y-axis direction). For example, as shown in FIGS. 22 and 23, the first supports 214 and 214' may be implemented such that the first supports 214 and 214' are not present between the second outer members 242 and 242' and the first potting portions 212 and 212' but are present only between the second packing body 240 and the first potting portions 212 and 212'. Consequently, the second outer members 242 and 242' may be pressed by the pressure of the dry gas received in the second outer groove 241, whereby the second outer members may be brought into tight contact with the first potting portions 212 and 212', respectively. The second packing body 240 may be compressed between the first supports 214 and 214' as the result of interference fit, whereby the second packing body may be brought into tight contact with the first supports 214 and 214'.

Each of the first supports 214 and 214' may be implemented so as to have the same length as the second packing member 24 or to have a larger length than the second packing member 24 in the second-axis direction (Y-axis direction). For example, as shown in FIG. 24, the first supports 214 and 214' may be implemented such that the first supports 214 and 214' are present between the second outer members 242 and 242' and the first potting portions 212 and 212' and are also present between the second packing body 240 and the first potting portions 212 and 212'. Consequently, the second outer members 242 and 242' and the second packing body 240 may be compressed between the first supports 214 and 214' as the result of interference fit, whereby the second outer members and the second packing body may be brought into tight contact with the first supports 214 and 214'. In this case, the second outer members 242 and 242' may be brought into tight contact with the cartridges 21 and 21', respectively, by both pressing by the first supports 214 and 214' and the pressure of the dry gas received in the second outer groove 241.

The present disclosure described above is not limited to the above embodiments and the accompanying drawings, and it will be obvious to a person having ordinary skill in the art to which the present disclosure pertains that various substitutions, modifications, and alterations are possible without departing from the technical idea of the present disclosure.

The invention claimed is:

1. A humidifier for fuel cells, the humidifier comprising: a humidifying module configured to humidify dry gas supplied from outside using wet gas discharged from a fuel cell stack; and a first cap coupled to one end of the humidifying module, wherein the humidifying module comprises: a mid-case; and at least one cartridge disposed in the mid-case, the cartridge being configured to receive a plurality of hollow fiber membranes, the humidifier further comprises a first packing member airtightly coupled to at least one end of the humidifying module through mechanical assembly such that the first cap fluidly communicates with only the hollow fiber membranes, the first packing member is brought into tight contact with the cartridge using pressure of at least one of dry gas and wet gas, wherein the first packing member comprises: a first inner surface disposed so as to face an interior of the mid-case; a first inner groove formed in the first inner surface, the first inner groove being configured to receive wet gas located in the mid-case; and a first inner member configured to contact the cartridge between the first inner groove and the cartridge, and the first inner member is pressed toward the cartridge depending on pressure of wet gas received in the first inner groove, whereby the first inner member is brought into tight contact with the cartridge.

2. The humidifier according to claim 1, wherein the first packing member comprises: a first outer surface disposed so as to face the first cap; a first outer groove formed in the first outer surface, the first outer groove being configured to receive dry gas located between the first cap and the cartridge; and a first outer member configured to contact the cartridge between the first outer groove and the cartridge, and the first outer member is pressed toward the cartridge depending on pressure of dry gas received in the first outer groove, whereby the first outer member is brought into tight contact with the cartridge.

3. The humidifier according to claim 2, wherein the first packing member comprises a first outer protrusion configured to contact the mid-case between the first outer groove and the mid-case, and wherein the first outer protrusion is pressed toward the mid-case depending on pressure of dry gas received in the first outer groove, whereby the first outer protrusion is brought into tight contact with the mid-case.

4. The humidifier according to claim 1, wherein the first packing member comprises a first inner protrusion configured to contact the mid-case between the first inner groove and the mid-case, and the first inner protrusion is pressed toward the mid-case depending on pressure of wet gas received in the first inner groove, whereby the first inner protrusion is brought into tight contact with the mid-case.

5. The humidifier according to claim 1, wherein the first packing member comprises:

an extension member extending toward the mid-case;

a catching groove formed in the extension member; and a catching member disposed outside of the mid-case, a portion of the mid-case being inserted into the catching groove.

6. The humidifier according to claim 5, wherein the first cap comprises a first pushing member configured to push the extension member toward the mid-case.

7. The humidifier according to claim 1, wherein the cartridge, in plural, is coupled to the mid-case, and the humidifying module comprises a second packing member disposed between the cartridges, the second packing member being configured to hermetically seal between the cartridges.

8. The humidifier according to claim 7, wherein the second packing member comprises: a second outer surface disposed so as to face the first cap; a second outer groove formed in the second outer surface; and a plurality of second outer members configured respectively to contact the cartridges between the second outer groove and the cartridges, and the second outer members are pressed toward the cartridges depending on pressure of dry gas received in the second outer groove, whereby the second outer members are brought into tight contact with the cartridges, respectively.

9. The humidifier according to claim 7, wherein the second packing member comprises: a second inner surface disposed so as to face an interior of the mid-case; a second inner groove formed in the second inner surface; and a plurality of second inner members configured respectively to contact the cartridges between the second inner groove and the cartridges, and the second inner members are pressed toward the cartridges depending on pressure of wet gas received in the second inner groove, whereby the second inner members are brought into tight contact with the cartridges, respectively.

10. The humidifier according to claim 7, wherein the first packing member and the second packing member are integrally formed.

11. The humidifier according to claim 1, wherein the first packing member comprises: a first outer groove configured to receive dry gas located between the first cap and the cartridge; a first outer member configured to be pressed toward the cartridge so as to be brought into tight contact with the cartridge depending on pressure of dry gas received in the first outer groove; a first outer protrusion disposed between the first outer groove and the mid-case; and an extension member extending from the first outer protrusion toward the mid-case, the first cap comprises: a first pushing member configured to push the extension member toward the mid-case; and a first pushing protrusion protruding from the first pushing member, and the first pushing protrusion presses the extension member toward the mid-case to bring the extension member into tight contact with the mid-case.

12. The humidifier according to claim 1, wherein the cartridge comprises: a first potting portion configured to fix one side of each of the hollow fiber membranes; and a first support coupled to the first potting portion, the first packing member comprises: a first outer groove configured to receive dry das located between the first cap and the cartridge; a first outer member configured to be pressed toward the cartridge so as to be brought into tight contact with the cartridge depending on pressure of dry gas received in the first outer groove; and a first packing body having the first outer groove formed therein, the first packing body is compressed between the mid-case and the first support as a result of interference fit, whereby the first packing body is brought into tight contact with the first support.

13. A humidifier for fuel cells, the humidifier comprising:

a humidifying module configured to humidify dry gas supplied from outside using wet gas discharged from a fuel cell stack; and a first cap coupled to one end of the humidifying module, wherein the humidifying module comprises: a mid-case; and at least one cartridge disposed in the mid-case, the cartridge being configured to receive a plurality of hollow fiber membranes, the humidifier further comprises a first packing member airtightly coupled to at least one end of the humidifying module through mechanical assembly such that the first cap fluidly communicates with only the hollow fiber membranes, the first packing member is brought into tight contact with the cartridge using pressure of at least one of dry gas and wet gas, the humidifying module comprises a first elastic member coupled to the first packing member, and the first elastic member brings the first packing member into tight contact with the cartridge using elastic force thereof, wherein the first packing member comprises: a first outer surface disposed so as to face the first cap; a first outer groove formed in the first outer surface; and a first outer member configured to contact the cartridge between the first outer groove and the cartridge and the first elastic member is inserted into the first outer groove to bring the first outer member into tight contact with the cartridge.

14. The humidifier according to claim 13, wherein the humidifying module comprises a second elastic member coupled to the first packing member, the first packing member comprises: a first inner surface disposed so as to face an interior of the mid-case; a first inner groove formed in the first inner surface; and a first inner member configured to contact the cartridge between the first inner groove and the cartridge, and the second elastic member is inserted into the first inner groove to bring the first inner member into tight contact with the cartridge.

15. The humidifier according to claim 13, wherein the first packing member comprises: a first inner surface disposed so as to face an interior of the mid-case; a first inner groove formed in the first inner surface; and a first inner member configured to contact the cartridge between the first inner groove and the cartridge, and the first elastic member is inserted into the first inner groove to bring the first inner member into tight contact with the cartridge.

16. The humidifier according to claim 13, wherein the first packing member comprises a first packing body disposed between the mid-case and the cartridge, and the first elastic member is disposed in the first packing body to bring the first packing body into tight contact with the cartridge.

17. The humidifier according to claim 13, wherein the cartridge, in plural, is coupled to the mid-case, the humidifying module comprises a second packing member disposed between the cartridges, the second packing member being configured to hermetically seal between the cartridges, the humidifying module comprising the first elastic member in plural, the first packing member comprises: a first outer surface disposed so as to face the first cap; a first outer groove formed in the first outer surface; and a first outer member configured to contact the cartridge between the first outer groove and the cartridge, the second packing member comprises: a second outer surface disposed so as to face the first cap; a second outer groove formed in the second outer surface; and a plurality of second outer members configured respectively to contact the cartridges between the second outer groove and the cartridges, and the first elastic members are inserted respectively into the first outer groove and the second outer groove to bring the first packing member and the second packing member into tight contact with the cartridges, respectively.

18. A humidifier for fuel cells the humidifier comprising:

a humidifying module configured to humidify dry gas supplied from outside using wet gas discharged from a fuel cell stack; and a first cap coupled to one end of the humidifying module, wherein the humidifying module comprises: a mid-case; and at least one cartridge disposed in the mid-case, the cartridge being configured to receive a plurality of hollow fiber membranes, the humidifier further comprises a first packing member airtightly coupled to at least one end of the humidifying module through mechanical assembly such that the first cap fluidly communicates with only the hollow fiber membranes, the first packing member is brought into tight contact with the cartridge using pressure of at least one of dry gas and wet gas, the first packing member comprises: a first outer groove configured to receive dry gas located between the first cap and the cartridge; and a first packing body having the first outer groove formed therein, and the first cap comprises a first supporting member inserted into the first outer groove, the first supporting member being configured to support the first packing body.

\* \* \* \* \*